United States Patent
Budagavi

(10) Patent No.: US 9,122,609 B2
(45) Date of Patent: Sep. 1, 2015

(54) CACHING METHOD AND SYSTEM FOR VIDEO CODING

(75) Inventor: Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 999 days.

(21) Appl. No.: 13/042,449

(22) Filed: Mar. 7, 2011

(65) Prior Publication Data

US 2012/0233405 A1   Sep. 13, 2012

(51) Int. Cl.
*G06T 1/60*     (2006.01)
*G06F 12/08*    (2006.01)

(52) U.S. Cl.
CPC ........ *G06F 12/0844* (2013.01); *G06F 12/0864* (2013.01); *G06F 12/0875* (2013.01); *G06T 1/60* (2013.01)

(58) Field of Classification Search
CPC ............................ G06T 1/60; H04N 19/00715
USPC .................. 345/530, 531, 536, 557, 564, 572
See application file for complete search history.

(56) References Cited

U.S. PATENT DOCUMENTS

| | | | | |
|---|---|---|---|---|
| 5,924,116 A | * | 7/1999 | Aggarwal et al. | 711/122 |
| 6,349,360 B1 | * | 2/2002 | Arimilli et al. | 711/118 |
| 7,006,100 B2 | * | 2/2006 | Phong et al. | 345/557 |
| 7,427,990 B2 | | 9/2008 | Sadowski | |
| 8,325,798 B1 | * | 12/2012 | Cismas et al. | 375/240.03 |
| 2006/0050976 A1 | | 3/2006 | Molloy | |
| 2007/0008323 A1 | | 1/2007 | Zhou | |
| 2007/0176939 A1 | | 8/2007 | Sadowski | |
| 2008/0292276 A1 | | 11/2008 | Horvath et al. | |
| 2009/0168882 A1 | | 7/2009 | Sadowski et al. | |

FOREIGN PATENT DOCUMENTS

EP    2 184 924 A2   12/2010

OTHER PUBLICATIONS

Arnaldo Azevedo and Ben Juurlink, "An Efficient Software Cache for H.264 Motion Compensation", Proceedings of IEEE International Symposium on System-on-Chip, Oct. 2009, pp. 147-150.

Sangyong Yoon and Soo-Ik Chae, "Cache Optimization for H.264/AVC Motion Compensation", IIEICE Trans. Inf. & Syst., vol. E91-D, No. 12, Dec. 2008, pp. 2902-2905.

* cited by examiner

*Primary Examiner* — Joni Richer
(74) *Attorney, Agent, or Firm* — Mirna Abyad; Frank D. Cimino

(57) ABSTRACT

A method of caching reference data in a reference data cache is provided that includes receiving an address of a reference data block in the reference data cache, wherein the address includes an x coordinate and a y coordinate of the reference data block in a reference block of pixels and a reference block identifier specifying which of a plurality of reference blocks of pixels includes the reference data block, computing an index of a set of cache lines in the reference data cache using bits from the x coordinate and bits from the y coordinate, using the index and a tag comprising the reference block identifier to determine whether the reference data block is in the set of cache lines, and retrieving the reference data block from reference data storage when the reference data block is not in the set of cache lines.

20 Claims, 17 Drawing Sheets

| VQAM IBBP xVid CODED BITSTREAMS (4 REF FRAMES) | 2-WAY INDEPENDENT | 2-WAY ADAPTIVE | 1-WAY INDEPENDENT | 1-WAY ADAPTIVE |
|---|---|---|---|---|
| catriverbedvipertrain_p1920x1080_24fps_420pl_60fr | -0.02% | -0.46% | 0.81% | -0.53% |
| sbreach_p1920x1080_30fps_420pl_60fr | 0.86% | -0.10% | 2.64% | -0.42% |
| sfadevipertraffic_p1920x1080_24fps_420pl_58fr | 2.76% | -0.35% | 2.19% | -0.28% |
| sfountain_p1920x1080_30fps_420pl_30fr | 8.16% | -0.01% | 13.82% | -0.01% |
| slceHockey_p1920x1080_30fps_420pl_60fr | 2.79% | -0.04% | 4.89% | -0.04% |
| sjuggle_p1920x1080_30fps_420pl_60fr | 1.06% | 0.00% | 1.72% | -0.10% |
| smaninrest_p1920x1080_30fps_420pl_60fr | 3.93% | -0.04% | 10.48% | -0.07% |
| smotionvipertraffic_p1920x1080_24fps_420pl_60fr | 0.61% | -0.12% | 1.20% | -0.18% |
| sPanIceHockey_p1920x1080_30fps_420pl_60fr | 0.05% | -0.05% | 3.64% | -0.27% |
| sriverbed_p1920x1080_30fps_420pl_30fr | -0.76% | -1.57% | 0.69% | -0.90% |
| ssunflower_p1920x1080_30fps_420pl_60fr | 5.57% | -0.10% | 4.54% | -0.11% |
| stractor_p1920x1080_30fps_420pl_60fr | 0.33% | -0.33% | 0.58% | -0.33% |
| svconf9_p1920x1080_30fps_420pl_60fr | 1.77% | 0.00% | 2.24% | -0.11% |
| svconf101_p1920x1080_30fps_420pl_60fr | 1.50% | 0.00% | 3.05% | -0.01% |
| svconf102_p1920x1080_30fps_420pl_60fr | 1.09% | 0.00% | 2.05% | 0.00% |
| sviperpouringliquids_p1920x1080_24fps_420pl_30fr | 1.94% | 0.00% | 1.75% | -0.18% |
| svipertrain_p1920x1080_24fps_420pl_30fr | 0.34% | -0.02% | 0.68% | -0.34% |
| snoreservations_p1920x816_25fps_420pl_59fr | 2.71% | -0.07% | 2.06% | -0.29% |
| sparkjoy_p1920x1080_25fps_420pl_60fr | 8.22% | -0.09% | 12.03% | 0.00% |
| sgoldendoor_p1920x1080_25fps_420pl_60fr | 1.04% | -0.32% | 0.74% | -0.90% |
| sfish_p1920x816_25fps_420pl_60fr | 0.46% | -0.21% | 0.35% | -0.48% |
| sfoolsgold_p1920x816_25fps_420pl_60fr | 2.14% | -0.24% | 1.44% | -0.48% |
| sfire_p1920x816_25fps_420pl_60fr | 5.47% | -0.43% | -0.42% | -0.72% |
| Average | 2.26% | -0.20% | 3.18% | -0.29% |
| Max | 8.22% | 0.00% | 13.82% | 0.00% |
| Min | -0.76% | -1.57% | -0.42% | -0.90% |

FIG. 7

| VQAM IPPP xVid CODED BITSTREAMS (4 REF FRAMES) | FULLY ASSOCIATIVE (1024 COMPARISONS) | | | FULLY ASSOCIATIVE (1024 COMPARISONS) AND ref_idx = 0 only | | | PERCENT INCREASE IN FETCHES | | |
|---|---|---|---|---|---|---|---|---|---|
| Sequence Name | Avg | P avg | B avg | Avg | P avg | B avg | Avg | P avg | B avg |
| catriverbedvipertrain_p1920x1080_24fps_420pl_60fr | 0.86 | 0.86 | 0.00 | 0.87 | 0.87 | 0.00 | 0.86% | 0.86% | |
| sbreach_p1920x1080_30fps_420pl_60fr | 0.95 | 0.95 | 0.00 | 0.95 | 0.95 | 0.00 | 0.13% | 0.13% | |
| sfadevipertraffic_p1920x1080_24fps_420pl_58fr | 1.14 | 1.14 | 0.00 | 1.15 | 1.15 | 0.00 | 1.43% | 1.43% | |
| sfountain_p1920x1080_30fps_420pl_30fr | 1.25 | 1.25 | 0.00 | 1.25 | 1.25 | 0.00 | 0.21% | 0.21% | |
| sIceHockey_p1920x1080_30fps_420pl_60fr | 1.24 | 1.24 | 0.00 | 1.25 | 1.25 | 0.00 | 0.27% | 0.27% | |
| sjuggle_p1920x1080_30fps_420pl_60fr | 1.17 | 1.17 | 0.00 | 1.18 | 1.18 | 0.00 | 1.38% | 1.38% | |
| smaninrest_p1920x1080_30fps_420pl_60fr | 1.13 | 1.13 | 0.00 | 1.14 | 1.14 | 0.00 | 0.12% | 0.12% | |
| smotionvipertraffic_p1920x1080_24fps_420pl_60fr | 1.16 | 1.16 | 0.00 | 1.17 | 1.17 | 0.00 | 0.65% | 0.65% | |
| sPanIceHockey_p1920x1080_30fps_420pl_60fr | 1.13 | 1.13 | 0.00 | 1.14 | 1.14 | 0.00 | 0.29% | 0.29% | |
| sriverbed_p1920x1080_30fps_420pl_30fr | 0.79 | 0.79 | 0.00 | 0.82 | 0.82 | 0.00 | 3.49% | 3.49% | |
| ssunflower_p1920x1080_30fps_420pl_60fr | 1.35 | 1.35 | 0.00 | 1.36 | 1.36 | 0.00 | 0.33% | 0.33% | |
| stractor_p1920x1080_30fps_420pl_60fr | 1.41 | 1.41 | 0.00 | 1.44 | 1.44 | 0.00 | 2.28% | 2.28% | |
| svconf9_p1920x1080_30fps_420pl_60fr | 1.04 | 1.04 | 0.00 | 1.04 | 1.04 | 0.00 | 0.20% | 0.20% | |
| svconf101_p1920x1080_30fps_420pl_60fr | 1.04 | 1.04 | 0.00 | 1.05 | 1.05 | 0.00 | 0.26% | 0.26% | |
| svconf102_p1920x1080_30fps_420pl_60fr | 1.07 | 1.07 | 0.00 | 1.07 | 1.07 | 0.00 | 0.24% | 0.24% | |
| sviperpouringliquids_p1920x1080_24fps_420pl_30fr | 1.07 | 1.07 | 0.00 | 1.07 | 1.07 | 0.00 | 0.13% | 0.13% | |
| svipertrain_p1920x1080_24fps_420pl_30fr | 1.06 | 1.06 | 0.00 | 1.07 | 1.07 | 0.00 | 0.53% | 0.53% | |
| snoreservations_p1920x816_25fps_420pl_59fr | 1.05 | 1.05 | 0.00 | 1.05 | 1.05 | 0.00 | 0.44% | 0.44% | |
| sparkjoy_p1920x1080_25fps_420pl_60fr | 1.37 | 1.37 | 0.00 | 1.38 | 1.38 | 0.00 | 1.06% | 1.06% | |
| sgoldendoor_p1920x1080_25fps_420pl_60fr | 0.55 | 0.55 | 0.00 | 0.55 | 0.55 | 0.00 | -0.43% | -0.43% | |
| sfish_p1920x816_25fps_420pl_60fr | 1.02 | 1.02 | 0.00 | 1.02 | 1.02 | 0.00 | 0.18% | 0.18% | |
| sfoolsgold_p1920x816_25fps_420pl_60fr | 0.86 | 0.86 | 0.00 | 0.87 | 0.87 | 0.00 | 0.75% | 0.75% | |
| sfire_p1920x816_25fps_420pl_60fr | 0.89 | 0.89 | 0.00 | 0.90 | 0.90 | 0.00 | 0.76% | 0.76% | |
| | | | | | | | | | |
| Ave | 1.07 | 1.07 | 0.00 | 1.08 | 1.08 | 0.00 | 0.68% | 0.68% | |
| Min | 0.55 | 0.55 | 0.00 | 0.55 | 0.55 | 0.00 | -0.43% | -0.43% | |
| Max | 1.41 | 1.41 | 0.00 | 1.44 | 1.44 | 0.00 | 3.49% | 3.49% | |

| VQAM IBBP xVid CODED BITSTREAMS (4 REF FRAMES) | FULLY ASSOCIATIVE (1024 COMPARISONS) | | | FULLY ASSOCIATIVE (1024 COMPARISONS) AND ref_idx = 0 only | | | PERCENT INCREASE IN FETCHES | | |
|---|---|---|---|---|---|---|---|---|---|
| Sequence Name | Avg | P avg | B avg | Avg | P avg | B avg | Avg | P avg | B avg |
| catriverbedvipertrain_p1920x1080_24fps_420pl_60fr | 1.10 | 0.62 | 1.36 | 1.11 | 0.63 | 1.37 | 0.82% | 2.23% | 0.47% |
| sbreach_p1920x1080_30fps_420pl_60fr | 1.52 | 0.69 | 1.95 | 1.52 | 0.69 | 1.95 | 0.05% | -0.14% | 0.09% |
| sfadevipertraffic_p1920x1080_24fps_420pl_58fr | 1.34 | 0.55 | 1.75 | 1.34 | 0.55 | 1.76 | 0.34% | -0.27% | 0.44% |
| sfountain_p1920x1080_30fps_420pl_30fr | 1.87 | 1.28 | 2.17 | 1.87 | 1.29 | 2.17 | 0.23% | 0.91% | 0.02% |
| sIceHockey_p1920x1080_30fps_420pl_60fr | 1.88 | 1.19 | 2.24 | 1.89 | 1.20 | 2.25 | 0.24% | 0.96% | 0.04% |
| sjuggle_p1920x1080_30fps_420pl_60fr | 1.65 | 1.12 | 1.92 | 1.66 | 1.13 | 1.93 | 0.60% | 0.99% | 0.49% |
| smaninrest_p1920x1080_30fps_420pl_60fr | 1.70 | 1.16 | 1.98 | 1.70 | 1.16 | 1.98 | 0.17% | 0.58% | 0.05% |
| smotionvipertraffic_p1920x1080_24fps_420pl_60fr | 1.65 | 0.95 | 2.04 | 1.66 | 0.96 | 2.04 | 0.31% | 0.95% | 0.14% |
| sPanIceHockey_p1920x1080_30fps_420pl_60fr | 1.66 | 0.96 | 2.03 | 1.66 | 0.96 | 2.03 | 0.17% | 0.42% | 0.11% |
| sriverbed_p1920x1080_30fps_420pl_30fr | 0.63 | 0.22 | 0.84 | 0.64 | 0.24 | 0.84 | 1.77% | 9.56% | 0.68% |
| ssunflower_p1920x1080_30fps_420pl_60fr | 1.94 | 1.40 | 2.22 | 1.96 | 1.45 | 2.23 | 0.89% | 3.17% | 0.13% |
| stractor_p1920x1080_30fps_420pl_60fr | 1.70 | 1.34 | 1.89 | 1.71 | 1.37 | 1.90 | 0.95% | 2.35% | 0.42% |
| svconf9_p1920x1080_30fps_420pl_60fr | 1.59 | 0.96 | 1.93 | 1.60 | 0.96 | 1.93 | 0.21% | 0.71% | 0.08% |
| svconf101_p1920x1080_30fps_420pl_60fr | 1.59 | 1.01 | 1.90 | 1.60 | 1.01 | 1.91 | 0.14% | 0.43% | 0.06% |
| svconf102_p1920x1080_30fps_420pl_60fr | 1.67 | 1.08 | 1.98 | 1.67 | 1.09 | 1.98 | 0.26% | 0.85% | 0.09% |
| sviperpouringliquids_p1920x1080_24fps_420pl_30fr | 1.68 | 1.05 | 2.04 | 1.69 | 1.05 | 2.04 | 0.13% | 0.54% | 0.01% |
| svipertrain_p1920x1080_24fps_420pl_30fr | 1.59 | 1.03 | 1.90 | 1.60 | 1.04 | 1.90 | 0.60% | 1.15% | 0.44% |
| snoreservations_p1920x816_25fps_420pl_59fr | 1.53 | 0.89 | 1.85 | 1.53 | 0.90 | 1.85 | 0.27% | 1.01% | 0.09% |
| sparkjoy_p1920x1080_25fps_420pl_60fr | 1.89 | 1.20 | 2.23 | 1.90 | 1.23 | 2.24 | 0.73% | 2.77% | 0.18% |
| sgoldendoor_p1920x1080_25fps_420pl_60fr | 1.08 | 0.26 | 1.55 | 1.08 | 0.26 | 1.56 | 0.13% | 0.34% | 0.11% |
| sfish_p1920x816_25fps_420pl_60fr | 1.42 | 0.72 | 1.77 | 1.42 | 0.72 | 1.77 | 0.03% | -0.04% | 0.04% |
| sfoolsgold_p1920x816_25fps_420pl_60fr | 1.24 | 0.46 | 1.62 | 1.24 | 0.46 | 1.63 | -0.03% | -1.33% | 0.15% |
| sfire_p1920x816_25fps_420pl_60fr | 1.35 | 0.75 | 1.65 | 1.35 | 0.76 | 1.65 | 0.46% | 1.15% | 0.31% |
| Ave | 1.53 | 0.91 | 1.86 | 1.54 | 0.92 | 1.87 | 0.41% | 1.27% | 0.20% |
| Min | 0.63 | 0.22 | 0.84 | 0.64 | 0.24 | 0.84 | -0.03% | -1.33% | 0.01% |
| Max | 1.94 | 1.40 | 2.24 | 1.96 | 1.45 | 2.25 | 1.77% | 9.56% | 0.68% |

CACHING METHOD AND SYSTEM FOR VIDEO CODING

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays, and personal video recorders). Further, video applications are becoming increasingly mobile as a result of higher computation power in handsets, advances in battery technology, and high-speed wireless connectivity.

Video compression is an essential enabler for digital video products. However, performing video compression may require significant computation and external memory bandwidth for acceptable performance. The external memory bandwidth requirement may be a performance bottleneck, especially in high-definition video coding and decoding in embedded systems. Motion prediction and motion compensation, an integral part of many current video compression standards, have the highest requirements for external memory bandwidth due to repeated and random accesses to reference frames stored in external memory. Accordingly, techniques for reducing external memory bandwidth requirements for motion prediction and motion compensation are needed.

BRIEF DESCRIPTION OF THE DRAWINGS

Particular embodiments in accordance with the invention will now be described, by way of example only, and with reference to the accompanying drawings:

FIGS. 7, 8A, and 8B show tables of experimental results in accordance with one or more embodiments of the invention;

DETAILED DESCRIPTION OF EMBODIMENTS OF THE INVENTION

Figures 1, 4:
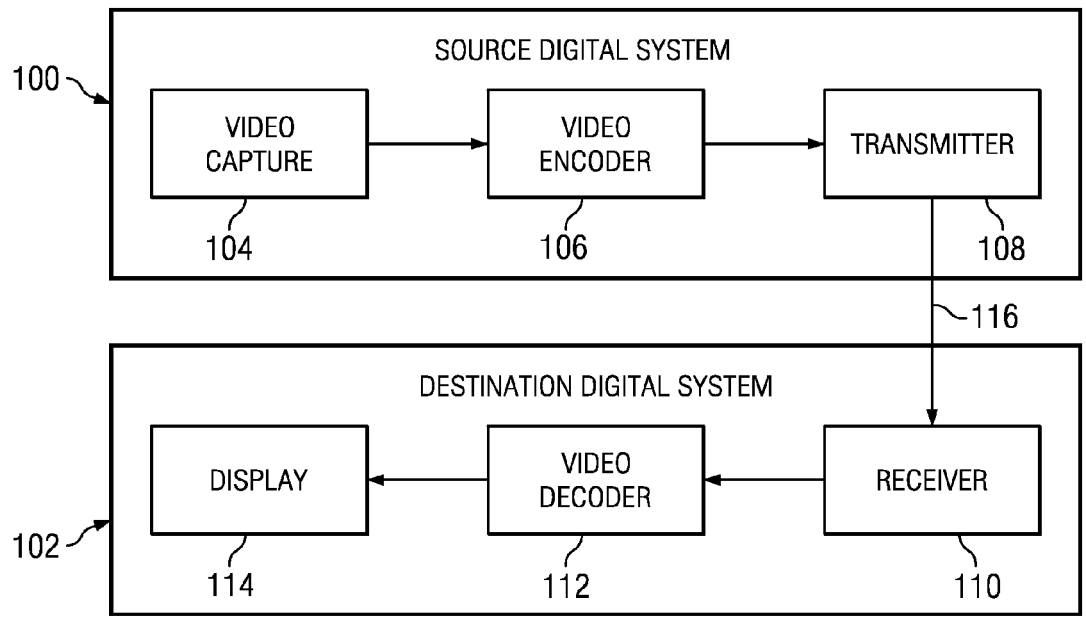
FIG. 1 shows a block diagram of a digital system in accordance with one or more embodiments of the invention.
FIG. 4 shows an example in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection. Further, example pseudo code is presented herein for illustrative purposes and should not be construed to limit the scope of the claimed invention.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, embodiments of the invention should not be considered limited to any particular video coding standard. In addition, for convenience in describing embodiments of the invention, the term frame may be used to refer to the portion, i.e., block of pixels, of a video sequence being encoded or decoded. One of ordinary skill in the art will understand embodiments of the invention that operate on subsets of frames such as, for example, a slice, a field, a video object plane, etc.

In general, embodiments of the invention provide for the reduction of external memory bandwidth during encoding and/or decoding of video sequences by caching reference frame data during motion prediction and/or motion compensation. In some embodiments of the invention, a horizontal cache is provided to cache the reference frame data, and in some embodiments of the invention, both a horizontal and a vertical cache are provided. In some embodiments of the invention, reference frame data from the most temporally recent reference frame is cached, e.g., for ref_idx=0 in H.264, and reference frame data from temporally older reference frames is not cached. In some embodiments of the invention, a novel indexing scheme based on the x coordinate and y coordinate of the requested block of reference frame data is used. That is, bits from the x coordinate and the y coordinate of a requested block of a reference frame are used to calculate an index into the cache. Further, the indexing scheme may be adapted for each frame depending upon the coding type of the frame, i.e., whether the frame is a P-frame, (a frame predicted from previous frames), or a B-frame (a frame predicted from both past and future frames).

For example, in some embodiments of the invention, bits from the x coordinate and the y coordinate of a requested block of a reference frame are used to calculate an index into a 2-way associative cache. This novel indexing scheme has been shown in simulations to reduce cache thrashing for frames with a width that is a large power of 2, e.g., a frame of width 1024, as compared to a more traditional cache indexing scheme using the LSB of the address of the requested block. Further, in some embodiments of the invention, the index calculation for the 2-way associative cache is adapted depending on the coding type of the frame. In addition, in some embodiments of the invention, bits from the x coordinate and the y coordinate of a requested block of a reference frame are used to calculate an index into a 1-way associative cache, i.e., a direct mapped cache. Further, in some embodiments of the invention, the index calculation for the 1-way associative cache is adapted depending on the coding type of the frame.

FIG. 1 shows a block diagram of a digital system in accordance with one or more embodiments of the invention. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of frames, divides the frames into coding units which may be a whole frame or a part of a frame, divides the coding units into blocks of pixels, and encodes the video data in the coding units based on these blocks. In some embodiments of the invention, the video encoder component (106) is configured to perform caching of reference frame data as described herein. The functionality of one or more embodiments of the video encoder component (106) is described in more detail below in reference to FIG. 2.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110) receives the encoded video data from the source digital system (100) via the communication channel (116) and provides the encoded video data to the video decoder component (112) for decoding. In general, the video decoder component (112) reverses the encoding process performed by the video encoder component (106) to reconstruct the frames of the video sequence. In some embodiments of the invention, the video decoder component (112) is configured to perform caching of reference frame data as described herein. The functionality of one or more embodiments of the video decoder component (112) is described in more detail below in reference to FIG. 3.

The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony. Further, a video encoder component may perform reference frame data caching as described herein when encoding a video sequence while a video decoder component receiving the encoded video sequence does not perform reference frame data caching as described herein and vice versa. Moreover, a video encoder component and a video decoder component receiving a video sequence encoded by the video encoder component may not both perform reference data caching in the same way. For example, a video encoder component may implement a two-way associative reference data cache in accordance with one or more embodiments described herein while the receiving video decoder component may implement a one-way associative reference data cache in accordance with one or more embodiments described herein.

The video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compression standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
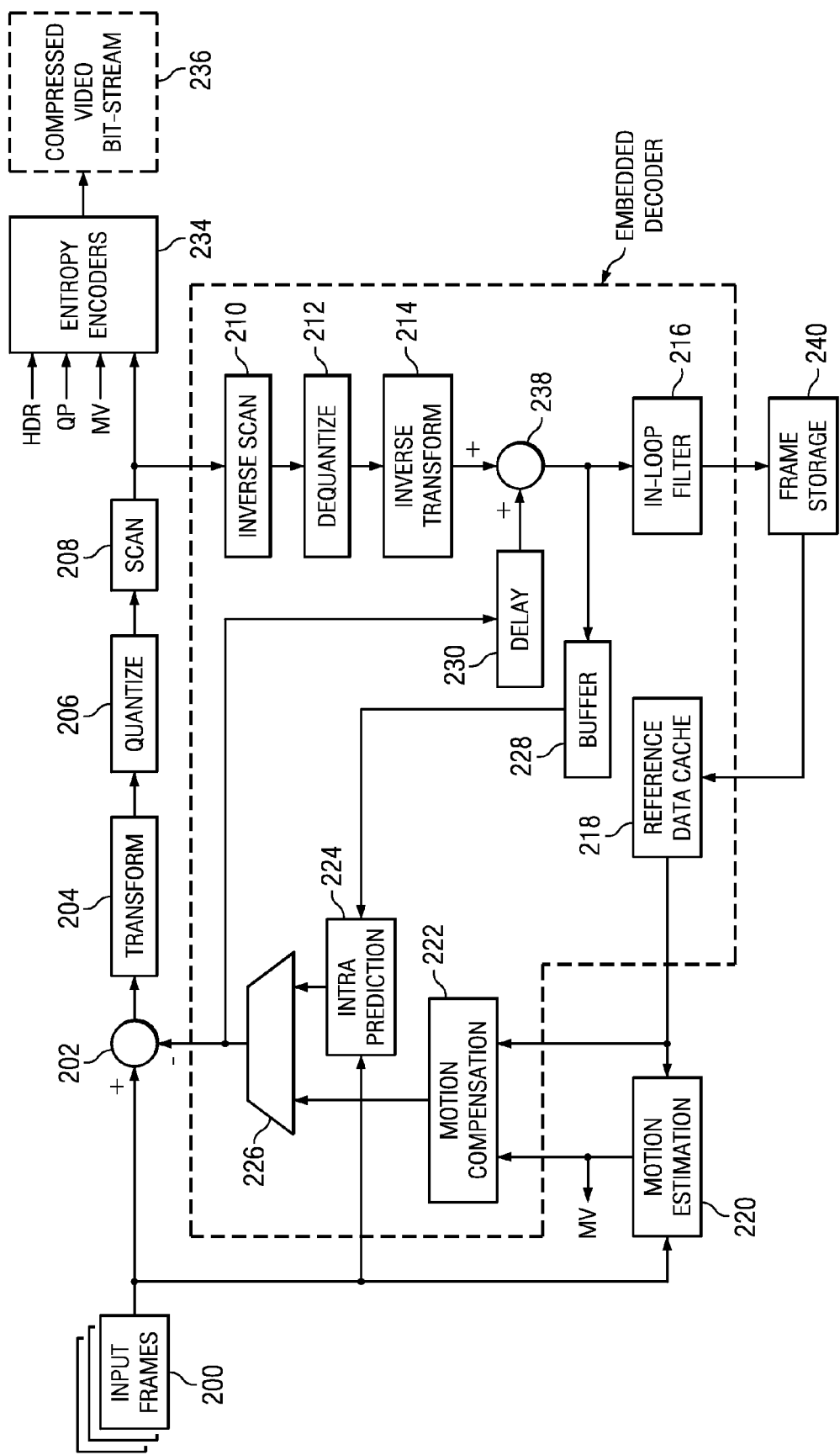
FIG. 2 shows a block diagram of a video encoder in accordance with one or more embodiments of the invention.

FIG. 2 shows a block diagram of a video encoder, e.g., the video encoder (106) of FIG. 1, in accordance with one or more embodiments of the invention. In the video encoder of FIG. 2, input frames (200) for encoding are divided into coding blocks, e.g., macroblocks, and the coding blocks are provided as one input of a motion estimation component (220), as one input of an intra prediction component (224), and to a positive input of a combiner (202) (e.g., adder or subtractor or the like). Further, although not specifically shown, a prediction mode, i.e., inter-prediction or intra-prediction, for each input frame is selected and provided to a mode selector component and the entropy encoders (234).

The frame storage component (240) stores reference frame data generated by the embedded decoder. The reference frame data may include one or more previously encoded and decoded coding blocks, i.e., reconstructed coding blocks. Further, reference frame data may be stored for multiple previously encoded frames. More specifically, in some video compression standards, multiple reference frames may be stored in the frame storage component (240) and used for motion prediction and motion compensation. For example, H.264 allows for the use of up to sixteen reference frames for motion prediction and motion compensation. In some embodiments of the invention, the frame storage component (240) is external memory, i.e., off-chip memory. Further, in one or more embodiments of the invention, the frame storage component (240) is tiled memory, i.e., is accessed using a tiled addressing scheme. Any suitable tiled addressing scheme may be used for the frame storage component (240).

The reference data cache component (218) provides cache memory between the frame storage component (240) and the motion estimation component (220) and the motion compensation component (222). More specifically, when the motion estimation component (220) or the motion compensation component (222) needs reference frame data, the reference data cache component (218) provides the needed reference frame data to the requesting component, either from cache memory included in the reference data cache component (218) or from the frame storage component (240) if the requested reference frame data is not stored in the cache memory. The functionality of one or more embodiments of the reference data cache component (218) is described in more detail below in reference to FIGS. 4-15.

The motion estimation component (220) provides motion estimation information to the motion compensation component (222) and the entropy encoders (234). More specifically, the motion estimation component (220) performs tests on coding blocks based on multiple temporal prediction modes using reference frame data to choose the best motion vector (s)/prediction mode based on a coding cost. To test the prediction modes, the motion estimation component (220) may divide a coding block into prediction blocks according to the block size of a prediction mode. The motion estimation component (220) provides the selected motion vector (MV) or vectors and the selected prediction mode to the motion compensation component (222) and the selected motion vector (MV) to the entropy encoders (234). The motion compensation component (222) provides motion compensated inter prediction information to a selector switch (226) that includes motion compensated inter prediction blocks and the selected temporal prediction modes. The coding cost of the inter prediction blocks are also provided to the mode selector component.

The intra prediction component (224) provides intra prediction information to the selector switch (226) that includes intra prediction blocks and the corresponding spatial prediction modes. That is, the intra prediction component (224) performs spatial prediction in which tests based on multiple spatial prediction modes are performed on the coding block using previously encoded neighboring blocks of the frame from the buffer (228) to choose the best spatial prediction mode for generating an intra prediction block based on a coding cost. To test the spatial prediction modes, the intra prediction component (224) may divide a coding block into prediction blocks according to the block size of a prediction mode. Although not specifically shown, the coding cost of the intra prediction blocks are also provided to the mode selector component.

The selector switch (226) selects between the motion-compensated inter prediction blocks from the motion compensation component (222) and the intra prediction blocks from the intra prediction component (224) based on the difference metrics of the blocks and a frame prediction mode provided by the mode selector component. The output of the selector switch (226), i.e., the predicted prediction block, is provided to a negative input of the combiner (202) and to a delay component (230). The output of the delay component (230) is provided to another combiner (i.e., an adder) (238). The combiner (202) subtracts the predicted prediction block from the current prediction block of the current coding block to provide a residual prediction block to the transform component (204). The resulting residual prediction block is a set of pixel difference values that quantify differences between pixel values of the original prediction block and the predicted prediction block.

The transform component (204) performs a block transform e.g., a discrete cosine transform (DCT), on the residual prediction blocks to convert the residual pixel values to transform coefficients and outputs the transform coefficients. The transform coefficients from the transform component (204) are provided to a quantization component (206) which outputs quantized transform coefficients. Because the block transform redistributes the energy of the residual signal into the frequency domain, the quantized transform coefficients are taken out of their raster-scan ordering a scan component (208) and arranged by significance, such as, for example, beginning with the more significant coefficients followed by the less significant. The ordered quantized transform coefficients provided via the scan component (208) along with header information are coded by the entropy encoder (234), which provides a compressed bit stream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent frames. To determine the reconstructed input, i.e., reference frame data, the ordered quantized transform coefficients provided via the scan component (208) are returned to their original post-transform arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual prediction block. The reconstructed residual prediction block is provided to the combiner (238).

The combiner (238) adds the delayed selected prediction block to the reconstructed residual prediction block to generate an unfiltered reconstructed prediction block, which becomes part of reconstructed frame information. The reconstructed frame information is provided via a buffer (228) to the intra prediction component (224) and to a filter component (216). The filter component (216) is an in-loop filter which filters the reconstructed frame information and provides filtered reconstructed coding blocks, i.e., reference frame data, to the frame storage component (240).

Figure 3:
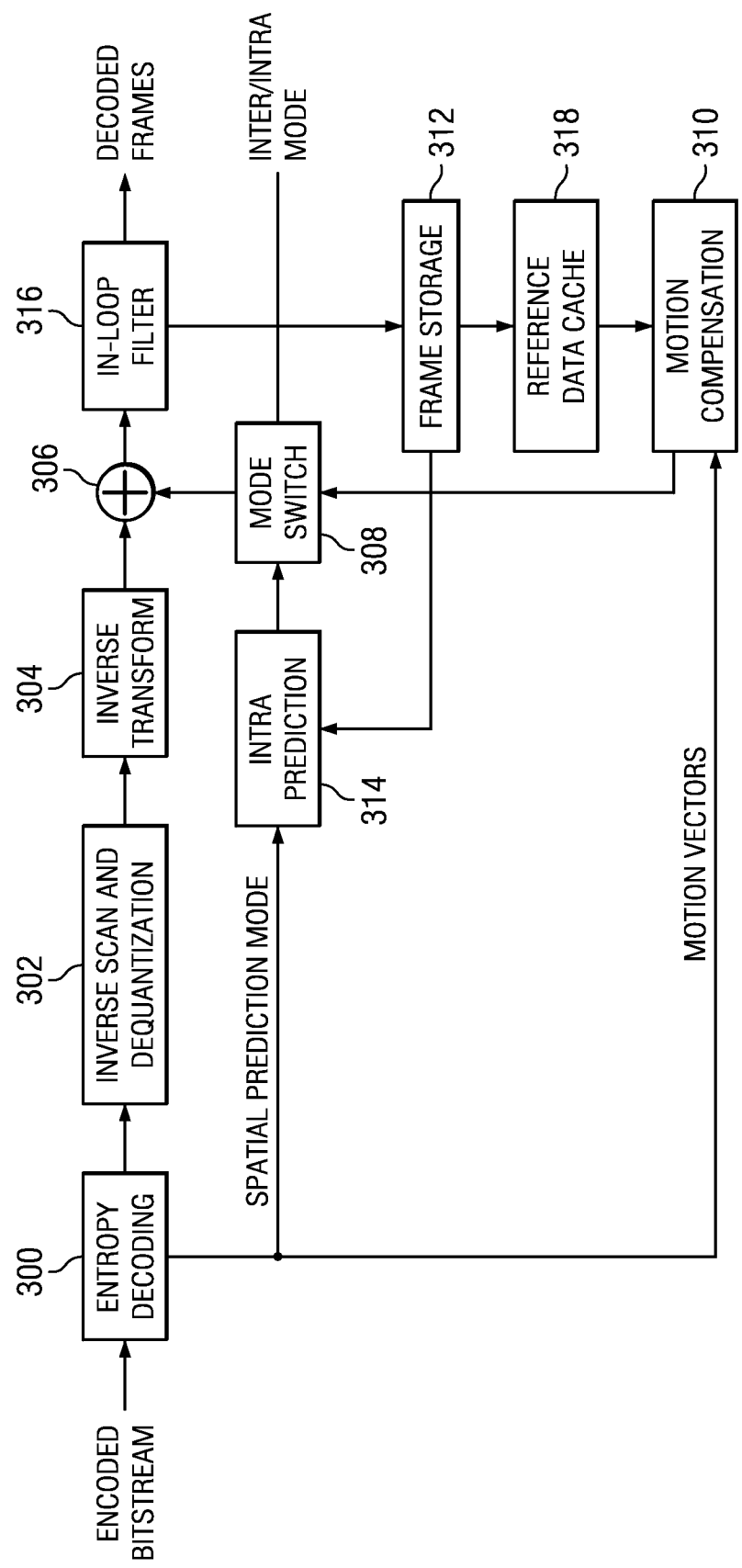
FIG. 3 shows a block diagram of a video decoder in accordance with one or more embodiments of the invention.

FIG. 3 shows a block diagram of a video decoder, e.g., the video decoder (112), in accordance with one or more embodiments of the invention. In the video decoder of FIG. 3, the entropy decoding component 300 receives an entropy encoded video bit stream and reverses the entropy encoding to recover the encoded coding blocks. The entropy decoding performed by the entropy decoder component (300) may include functionality to perform one or more of any suitable entropy decoding techniques, such as, for example, context adaptive variable length decoding (CAVLC), context adaptive binary arithmetic decoding (CABAC), run length decoding, etc.

The inverse scan and dequantization component (302) assembles the coding blocks in the video bit stream in raster scan order and substantially recovers the original frequency domain data, de-quantized residual coefficients. The inverse transform component (304) transforms the frequency domain data from inverse scan and dequantization component (302) back to a residual prediction block. That is, the inverse transform component (304) applies an inverse block transform, i.e., the inverse of the block transform used for encoding, to the de-quantized residual coefficients to produce the residual prediction block.

This residual prediction block supplies one input of the addition component (306). The other input of the addition component (306) comes from the mode switch (308). When inter-prediction mode is signaled in the encoded video stream, the mode switch (308) selects a prediction block from the motion compensation component (310) and when intra-prediction is signaled, the mode switch selects a prediction block from the intra prediction component (314). The motion compensation component (310) receives reference frame data from the reference data cache (318) and applies the motion compensation computed by the encoder and transmitted in the encoded video bit stream to the reference frame data to generate a prediction block.

The reference data cache component (318) provides cache memory between the frame storage component (312) and the motion compensation component (310). More specifically, when the motion compensation component (310) needs reference frame data, the reference data cache component (318) provides the needed reference frame data to the motion compensation component (310), either from cache memory included in the reference data cache component (318) or from the frame storage component (312) if the requested reference frame data is not stored in the cache memory. The functionality of one or more embodiments of the reference data cache component (318) is described in more detail below in reference to FIGS. 4-15.

The intra-prediction component (314) receives previously decoded prediction blocks from the current frame and applies the intra-prediction computed by the encoder as signaled by a spatial prediction mode transmitted in the encoded video bit stream to the previously decoded prediction blocks to generate a prediction block.

The addition component (306) recovers the predicted prediction block, i.e., generates a decoded prediction block, by adding the selected prediction block and the residual prediction block. The output of the addition component (306) supplies the input of the in-loop filter component (316). The in-loop filter component (316) smoothes artifacts created by the block nature of the encoding process to improve the visual quality of the decoded frame. The output of the in-loop filter component (316) is the decoded frames of the video bit stream.

Each decoded prediction block is stored in the frame storage component (312) to be used as reference frame data. Further, reference frame data may be stored for multiple previously encoded frames. More specifically, in some video compression standards, multiple reference frames may be stored in the frame storage component (312) and used for motion compensation. For example, H.264 allows for the use of multiple reference frames for motion compensation for both P-frames and B-frames. In some embodiments of the invention, the frame storage component (312) is external memory, i.e., off-chip memory. Further, in one or more embodiments of the invention, the frame storage component (312) is tiled memory, i.e., is accessed using a tiled addressing scheme.

The functionality of one or more embodiments of a reference date cache component (218, 318) and interaction with the motion prediction component (220), the motion compensation components (218, 318) and the frame storage components (240, 312) is now explained in reference to FIGS. 4-15. In one or more embodiments of the invention, the motion prediction component (220) and motion compensation components (222, 310) use a tiled addressing scheme to request reference frame data from the respective reference frame data cache components (218, 318) for the current frame, i.e., the frame being encoded or decoded. Further, the respective reference frame cache components (218, 318) provide caching of reference frame data for the current frame being encoded or decoded. That is, after completing the encoding or decoding of a frame, the cache lines in a reference data cache component (218, 318) are invalidated prior to encoding or decoding the next frame.

In the tiled addressing scheme, a reference frame is considered to be divided into reference data blocks, and each reference data block may be requested by specifying the x coordinate, xaddr, and y coordinate, yaddr, of the block in the reference frame relative to the upper left corner of the reference frame. The size of a reference data block is a design choice. FIG. 4 shows a simple example of this tiled addressing scheme for a 16×16 reference frame in which the reference data block size is 4×4. The upper left corner of the reference frame is considered to be at xaddr=0, yaddr=0. Accordingly, block A is at xaddr=0, yaddr=0, and block B is at xaddr=1, yaddr=0. Further, block J is at xaddr=1, yaddr=2. In general, the coordinates of a reference data block may be determined by dividing the pixel coordinates in the reference frame of the upper left corner of the reference data block by the respective width and height of the reference data block. For example, in FIG. 4, the pixel coordinates of block G are x=8 and y=4. Thus, the coordinates of the block G in the tiled addressing scheme would be xaddr=8/4=2 and yaddr=4/4=1.

In embodiments of the video encoder and video decoder supporting motion prediction and motion compensation using multiple reference frames, the requesting component also provides a reference frame identifier that specifies from which of the multiple reference frames to read the block of reference frame data. The reference frame identification scheme used may be any suitable scheme and may depend on the compression standard supported by the encoder/decoder. For example, in H.264, each reference frame is identified by a reference frame index and there may be up to 16 reference frames. Thus, in H.264, the reference frame index may range from 0 to 15. The reference frame temporally closest to the frame being encoded typically has a reference index of 0, and the reference index typically increases by one with the temporal distance of a reference frame. Each time a new reference frame is stored, the new reference frame is typically given the reference index of 0 and the references indices of the temporally older reference frames are each increased by one. For bidirectional predicted pictures, there may be two reference picture lists, referred to as RefPicList0 and RefPicList1 in H.264, to store the list of reference indices used for prediction in forward and backward direction respectively.

For simplicity of explanation, support of sixteen reference frames with reference frame indices as identifiers and a reference data block size of 4×4 (16 pixels) is assumed in further description of embodiments of the invention. One of ordinary skill in the art will understand embodiments in which multiple reference frames are not supported or the number of reference frames supported is different or one or two reference picture lists are used, and/or in which other reference data block sizes are used.

In one or more embodiments of the invention, the reference frame identifier, the component (218, 318). The number of bits in the address depends upon the largest frame size supported by the video encoder or video decoder, the size of the reference data blocks, and the number of bits needed for the reference frame identifier. For example, if the largest frame size supported is 1920×1080 and 16 reference frames are permitted, 9 bits are needed for the xaddr, 8 bits are needed for yaddr, and 4 bits are need for the reference frame index, thus resulting in a 21 bit address.

In one or more embodiments of the invention, the reference data cache component (218, 318) is an associative cache that includes data storage, tag storage, and valid bit storage. The associativity of the reference data cache component (218, 318) is a design choice. That is, a trade-off may be made between cache complexity and memory bandwidth reduction. For example, using a fully associative 16 KB cache may provide approximately 40-50% reduction in memory bandwidth over directly accessing frame storage (240, 312) but will require 1024 comparators. In contrast, using a two-way associative 16 KB cache requires 2 comparators rather than 1024 and, as is shown in more detail herein, may provide a sufficiently comparable reduction in memory bandwidth. The general operation of associative caches is well understood in the art and thus is not explained in detail herein.

The data storage, tag storage, and valid bit storage in the reference data cache component (218, 318) may be combined or may be separate. The amount of memory in the data storage is a design choice. The memory in the data storage is partitioned into multiple cache lines, each of a sufficient size to store one reference data block. For example, for a reference data block of size 4×4, each cache line would store sixteen bytes.

The tag storage includes sufficient memory to store one tag for each cache line in the data storage, and the valid bit storage includes sufficient memory to store 1 bit for each cache line in the data storage. The amount of memory needed for tag storage depends on the size of the data storage and the associativity of the cache. For example, for a fully associative cache, a tag would be the complete address of a reference data block, for a two-way associative 16 KB cache with 16 byte cache lines, the least significant 9 bits of the reference data block address may be used as an index into the cache and the remaining 12 bits would be the tag, and for a four way associative 16 KB cache with 16 byte cache lines, the least significant 8 bits of the address may used as an index and the remaining 13 bits would be the tag.

Figure 5:
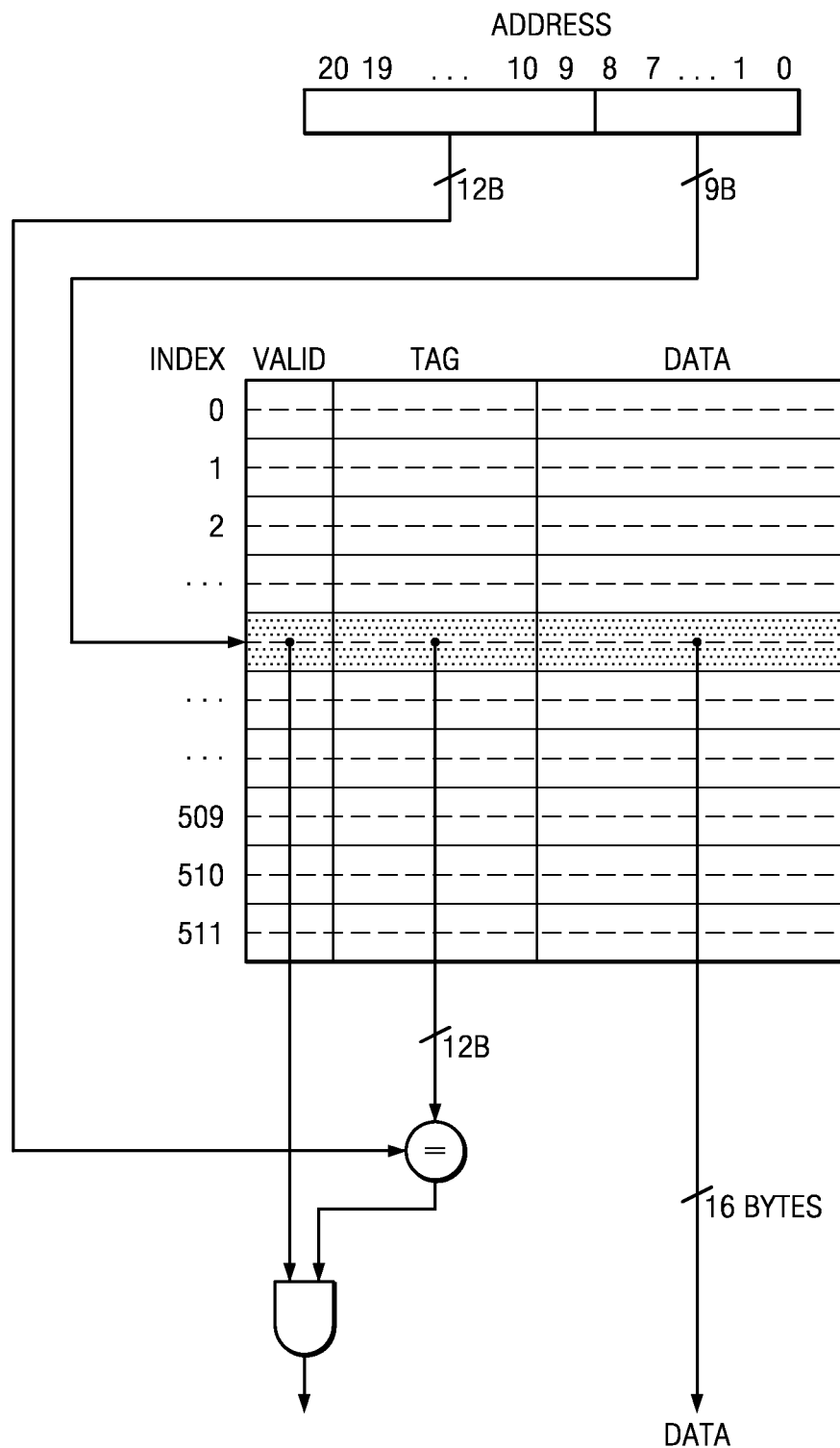
FIGS. 5 and 6 show block diagrams of reference data cache components in accordance with one or more embodiments of the invention.

FIG. 5 shows a block diagram of an example reference data cache component (218, 318) implemented as a two-way associative cache in accordance with one or more embodiments of the invention. The largest frame size is assumed to be 1920×1080. Thus, as was explained in a previous example, the address of a reference data block is 21 bits. In this example, bits 0-8 of the address are the xaddr of the reference data block, bits 9-16 are the yaddr of the reference data block, and bits 17-20 are the reference frame identifier. The data storage is 16 KB. That is, the data storage is partitioned into 1024 16-byte cache lines. Because the cache is two-way associative, the least significant nine bits of the address, i.e., bits 0-8, are used for the cache index. The remaining most significant twelve bits of the address form the tag. Thus, the index into the cache may be computed as addr & 0x1FF where addr is the address of a reference data block.

Using the least significant bits of the reference data block address as the index into the cache may cause significant cache thrashing for frames with a width that is a large power of two, e.g., 1024. Thrashing may occur when reference data in the frame storage component (240, 312) is accessed in a pattern that causes multiple memory locations in the frame storage component (240, 312) to compete for the same cache line resulting in excessive cache misses. To reduce thrashing, a cache indexing strategy may be used to spread out the filling of the cache. In one or more embodiments of the invention, rather than using the least significant bits of the address of a reference data block as the index into the cache, an index is computed using selected bits from the x coordinate and selected bits from the y coordinate in the address. That is, a predetermined number of bits from the x coordinate is concatenated with a predetermined number of bits from the y coordinate to form the index. The number of bits used from each coordinate and the concatenation order may be empirically determined, e.g., simulations may be performed with various bit choices to determine which combination provides the best performance.

Figure 6:
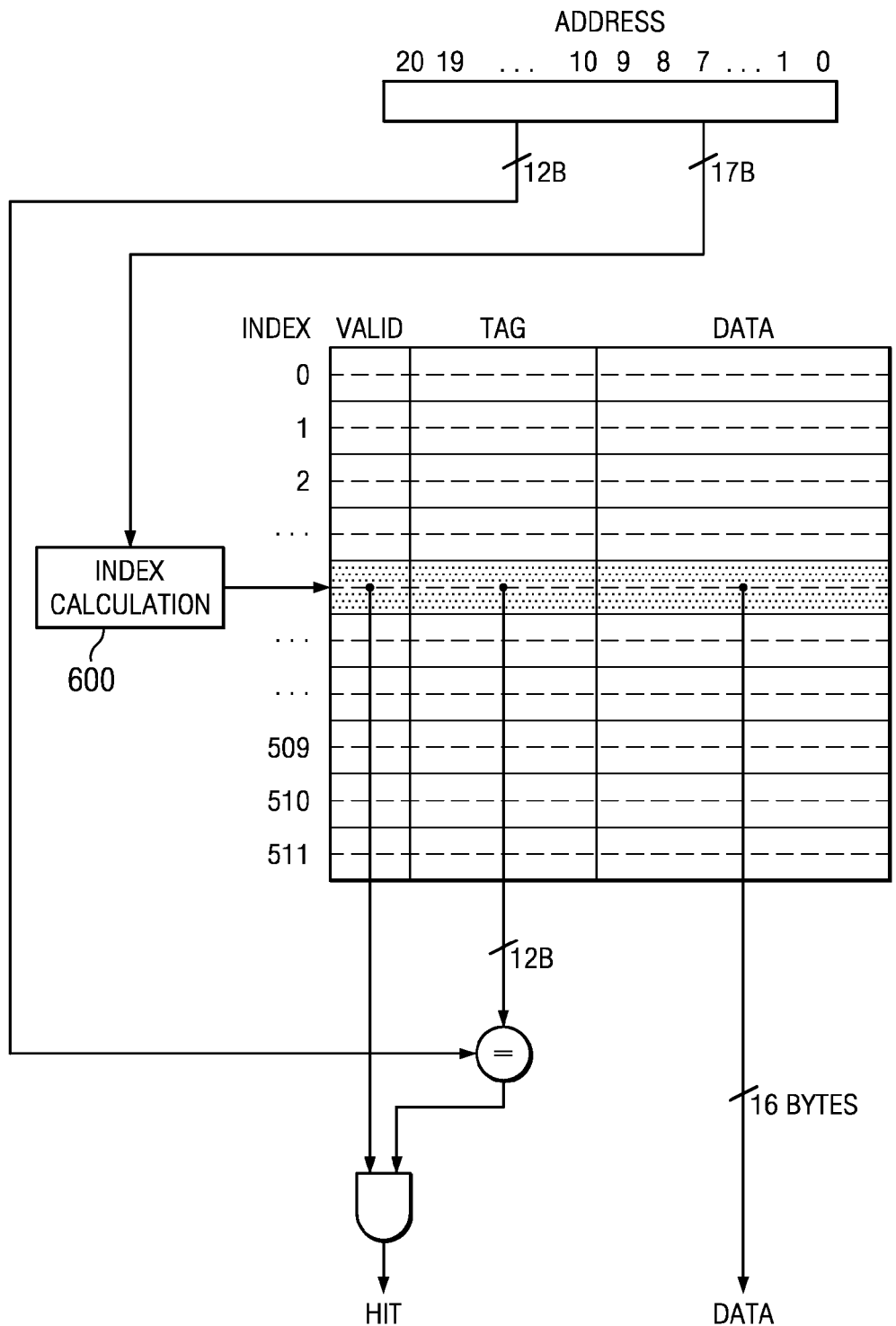

FIG. 6 shows a block diagram of an example reference data cache component (218, 318) using such an indexing scheme in accordance with one or more embodiments of the invention. The cache of FIG. 6 is identical to that of FIG. 5 except for the addition of an index calculation component (600). The index calculation component (600) receives the least significant 17 bits of the address, i.e., the x coordinate and the y coordinate, and computes a 9 bit index into the cache as depicted in the pseudo code of Table 1. As can be seen in this pseudo code, the 9 bit index is formed by concatenating the least significant 7 bits of the x coordinate with the least significant two bits of the y coordinate. The tag remains the same as the cache of FIG. 5, i.e., the most significant 12 bits of the address.

TABLE 1 xLsb = xAddr & 0x7F;
yLsb = yAddr & 0x3;
index = (xLsb<<2)+yLsb;

Decoding simulations were performed using a fully associative cache 16 KB cache, the two-way associative cache of FIG. 5 using the 9-bits LSB index, and the two-way associative cache of FIG. 6 using the index computed from the x coordinate and the y coordinate. The video stream used was sPanIceHockey_p960×960_30fps_420pl_60fr.34.264 (padded dimension 1024×1024). The simulations were performed using an IPPP coding structure and an IBBP coding structure. Table 2 shows the results of these simulations. As this table shows, the increase in bandwidth in the two-way associative cache using the LSB bits as an index over the fully associative cache was significantly more than that of the two-way associative cache using the index computation scheme.

TABLE 2

| Associativity | IPPP (Normalized Memory Bandwidth) | Percent increase in bandwidth compared to full associative | IBBP (Normalized Memory Bandwidth) | Percent increase in bandwidth compared to full associative |
|---|---|---|---|---|
| 1024 (Full associative) | 1.04 | | 1.64 | |
| 2-way using LSB | 1.22 | 17.31% | 1.96 | 19.51% |
| 2-way using xAddr, yAddr | 1.08 | 3.85% | 1.67 | 1.83% |

The reference data block accesses for encoding and decoding B-frames may also cause significant cache thrashing as the reference data blocks may accessed in a pattern that causes multiple memory locations in the frame storage component (240, 312) to compete for the same cache line resulting in excessive cache misses. To reduce such thrashing, a cache indexing strategy may be used that spreads out the filling of the cache by adapting the cache index based on the prediction direction when a B-frame is encoded or decoded. More specifically, the cache index is computed using selected bits from the x coordinate, selected bits from the y coordinate, and a value representing the prediction direction, i.e., forward prediction or back prediction. Any suitable values may be used for the two prediction directions. In some embodiments of the invention, the prediction direction value for forward prediction is 0 and the prediction direction value for backward prediction is 1.

For example, assuming the cache of FIG. 6, the cache index may be computed as shown in the pseudo code of Table 3. As is shown in this pseudo code, if the coding type indicates that a P-frame is being encoded or decoded, the cache index is computed using the x coordinate and the y coordinate as previously described. If the coding type indicates that a B-frame is being encoded, the 9 bit cache index is formed by concatenating the six least significant bits of the x coordinate with the two least significant bits of the y coordinate and the prediction direction value. The tag remains the same as the cache of FIG. 5, i.e., the most significant 12 bits of the address.

TABLE 3

```
// xAddr and yAddr are x- and y-coordinates of 4x4 block
// predDir = 0 for forward prediction, 1 for backward pred
if(codingType == P) {
    xLsb = xAddr & 0x7F;
    yLsb = yAddr & 0x3;
    index = (xLsb<<2)+yLsb;
    }
else {
    xLsb = xAddr & 0x3F;
    yLsb = yAddr & 0x3;
    index = (xLsb<<3)+(yLsb<<1)+predDir;
    }
```

Table 4 shows pseudo code of another example of coding type adaptive cache index computation assuming a one-way associative, i.e., direct mapped, 16 KB cache. The largest frame size is again assumed to be 1920×1080 as is the previously described 21-bit address. Because the cache is one-way associative, a ten bit index is needed. The most significant eleven bits of the address form the tag. As is shown in this pseudo code, if the coding type indicates that a P-frame is being encoded or decoded, the 10 bit cache index is formed by concatenating the least significant five bits of the x coordinate and the least significant 5 bits of the y coordinate. If the coding type indicates that a B-frame is being encoded, the 10 bit cache index is formed by concatenating the five least significant bits of the x coordinate with the four least significant bits of the y coordinate and the prediction direction value.

TABLE 4

```
// xAddr and yAddr are x- and y-coordinates of 4x4 block
// predDir = 0 for forward prediction, 1 for backward pred
if(codingType == P) {
    xLsb = xAddr & 0x1F;
    yLsb = yAddr & 0x1F;
    index = (xLsb<<5)+yLsb;
    }
else {
    xLsb = xAddr & 0x1F;
```

TABLE 4-continued

```
    yLsb = yAddr & 0xF;
    index = (xLsb<<5)+(yLsb<<1)+predDir;
    }
```

Table 5 shows pseudo code of another example of coding type adaptive cache index computation assuming a four-way 16 KB associative cache. For this cache, the cache index is 8 bits and the tag is the 13 most significant bits of the address. As can be seen in this pseudo code, if the coding type indicates that a P-frame is being encoded or decoded, the 8-bit index is formed by concatenating the least significant 6 bits of the x coordinate with the least significant two bits of the y coordinate. If the coding type indicates that a B-frame is being encoded, the 8-bit cache index is formed by concatenating the five least significant bits of the x coordinate with the two least significant bits of the y coordinate and the prediction direction value.

TABLE 5

```
if(codingType == P) {
    xLsb = xAddr & 0x3F;
    yLsb = yAddr & 0x3;
    index = (xLsb<<2)+yLsb;
}
else {
    xLsb = xAddr & 0x1F;
    yLsb = yAddr & 0x3;
    index = (xLsb<<3)+(yLsb<<1)+predDir;
}
```

FIG. 7 shows the results of H.264 decoding simulations performed using various cache configurations and index computation schemes. In the simulations, an IBBP coding structure was used for twenty three test video sequences. Also, four reference frames per prediction direction were used. All data in the table is in terms of the percentage of additional data fetched from external memory for B-frames as compared to using a fully associative cache. Column 2 shows the results of using a 16 KB two-way associative cache with the cache index formed as per the pseudo code of Table 1. Column 3 shows the results of using a 16 KB two-way associative cache with the cache index formed as per the pseudo code of Table 3, i.e., where the index is adapted based on the prediction direction for B-frames. Column 4 shows the results of using a 16 KB one-way associative cache with the cache index formed as per the pseudo code of Table 4 assuming that the coding type is always P, i.e., without the adaptation for frame coding type. Column 5 shows the results of using a 16 KB one-way associative cache with the cache index formed as per the pseudo code of Table 4, i.e., where the index is adapted based on the prediction direction for B-frames. As can be seen from these results, using the coding type adaptive index provided better performance than using the non-adaptive index.

In one or more embodiments of the invention, the reference data cache component (218, 318) caches reference data blocks from the most temporally recent reference frame, e.g., with ref_idx=0 in H.264, and does not cache reference data blocks from any other reference frame. More specifically, if a reference data block is requested from any reference frame other than the most temporally recent reference frame, the reference data cache component bypasses the cache memory and retrieves the requested block from the frame storage component (240, 312). In such embodiments, the tag storage space may be reduced significantly as there is no need to include the reference frame identifier of a reference data block in the tag. For example, assuming a maximum frame size of 1920×1080, the tag for a fully associative cache requires 21 bits of storage if blocks are cached from all possible reference frames. If the need to include the reference frame identifier in the tag is eliminated, there is a 19% savings in complexity and tag storage area.

In H.264, as shown in Table 6, ref_idx=0 for the majority of the macroblocks in most of the test video bitstreams. As a result, data from reference frames with ref_idx≠0 is accessed in a sparse fashion leading to minimal overlap in data fetched from frames with ref_idx≠0. Since the amount of overlap is low, the amount of data that gets cached and refetched from frames with ref_idx≠0 is also low. So there is no significant loss of overall cache performance if only ref_idx≠0 is cached.

In video encoding and decoding, there is both horizontal locality and vertical locality in accessing reference frame data. As the encoding or decoding moves through sequential coding blocks, e.g., macroblocks, in a row of a frame, there is horizontal overlap between the reference frame data used from one coding block to the next. There is also vertical overlap between the reference frame data used between coding blocks in a row of the frame and the coding blocks in the preceding and following rows of the frame. A large cache size is required to capture both horizontal and vertical locality, e.g., to capture locality in three rows above and below the current macroblock row for a 1080p video frame, a cache memory size of around 7 rows*16 lines per row*1088 pixels

TABLE 6

| | ref_idx distribution for IPPP coded bistreams (percent of macroblocks) | | | |
|---|---|---|---|---|
| | ref_idx = 0 | ref_idx = 1 | ref_idx = 2 | ref_idx = 3 |
| catriverbedvipertrain_p1920x1080_24fps_420pl_60fr | 60.10% | 17.50% | 12.60% | 9.80% |
| sbreach_p1920x1080_30fps_420pl_60fr | 88.50% | 6.00% | 3.50% | 2.10% |
| sfadevipertraffic_p1920x1080_24fps_420pl_58fr | 78.50% | 10.80% | 6.70% | 4.00% |
| sfountain_p1920x1080_30fps_420pl_30fr | 81.00% | 10.00% | 6.10% | 2.80% |
| sIceHockey_p1920x1080_30fps_420pl_60fr | 88.30% | 6.60% | 3.50% | 1.60% |
| sjuggle_p1920x1080_30fps_420pl_60fr | 55.10% | 15.80% | 21.00% | 8.10% |
| smaninrest_p1920x1080_30fps_420pl_60fr | 91.90% | 4.70% | 2.40% | 1.00% |
| smotionvipertraffic_p1920x1080_24fps_420pl_60fr | 89.50% | 6.10% | 3.10% | 1.30% |
| sPanIceHockey_p1920x1080_30fps_420pl_60fr | 80.70% | 10.30% | 6.00% | 3.00% |
| sriverbed_p1920x1080_30fps_420pl_30fr | 47.80% | 21.70% | 17.70% | 12.80% |
| ssunflower_p1920x1080_30fps_420pl_60fr | 93.20% | 3.20% | 1.90% | 1.70% |
| stractor_p1920x1080_30fps_420pl_60fr | 86.60% | 7.70% | 3.40% | 2.30% |
| svconf9_p1920x1080_30fps_420pl_60fr | 81.70% | 10.50% | 5.50% | 2.30% |
| svconf101_p1920x1080_30fps_420pl_60fr | 83.20% | 10.00% | 4.90% | 1.80% |
| svconf102_p1920x1080_30fps_420pl_60fr | 80.10% | 10.00% | 7.00% | 2.90% |
| sviperpouringliquids_p1920x1080_24fps_420pl_30fr | 82.70% | 11.70% | 4.40% | 1.30% |
| svipertrain_p1920x1080_24fps_420pl_30fr | 69.30% | 13.00% | 8.50% | 9.30% |
| snoreservations_p1920x816_25fps_420pl_59fr | 82.80% | 9.70% | 5.00% | 2.50% |
| sparkjoy_p1920x1080_25fps_420pl_60fr | 92.60% | 4.10% | 2.10% | 1.10% |
| sgoldendoor_p1920x1080_25fps_420pl_60fr | 80.40% | 10.60% | 5.90% | 3.10% |
| sfish_p1920x816_25fps_420pl_60fr | 92.70% | 4.40% | 2.00% | 0.90% |
| sfoolsgold_p1920x816_25fps_420pl_60fr | 85.60% | 9.20% | 3.30% | 1.90% |
| sfire_p1920x816_25fps_420pl_60fr | 81.80% | 8.80% | 5.80% | 3.70% |

In some embodiments of the invention, when pictures are interlaced, the reference data cache component (218, 318) caches reference picture data blocks from the two most temporally recent reference fields, e.g., with ref_idx=0, 1 in H.264, and does not cache reference data blocks from any other reference fields. More specifically, if a reference data block is requested from any reference field other than the two most temporally recent reference fields, the reference data cache component bypasses the cache memory and retrieves the requested block from the frame storage component (240, 312). In such embodiments, the tag storage space may be reduced significantly as only one bit of the reference frame identifier of a reference data block needs to be included in the tag.

FIGS. 8A and 8B show the results of H.264 decoding simulations performed using a fully associative 16 KB cache with caching of blocks from all reference frames and with caching of blocks from only the most temporally recent reference frames. In the simulations, an IPPP coding structure (FIG. 8A) and an IBBP coding structure (FIG. 8B) were used for twenty three test video sequences. Also, four reference frames per prediction direction were used. As the results in these two tables show, the average percent increase in memory bandwidth of caching only from the most temporally recent reference frames as opposed to caching from all reference frames is less than 1%.

per line=119 Kbytes of cache is required. The previously described reference frame cache embodiments can be used for this purpose, but the amount of tag memory required increases significantly. For example, for the cache configuration shown in FIG. 5, the amount of tag memory required is 12 bits per tag*7*1088=11.5 KB. Since the cache control logic (of which the tag memory is a part) may be designed using high speed logic, this increase in tag size memory becomes very expensive. Hence, an optimized cache structure that is tailored to exploit the vertical locality may be used.

In one or more embodiments of the invention, the reference data cache component (218, 318) provides both a horizontal cache and a vertical cache. The horizontal cache may be an associative cache in accordance with an embodiment as previously described herein. The vertical cache stores reference data blocks within a vertical range of rows of reference coding blocks. That is, the vertical cache stores reference data blocks from the row of reference coding blocks corresponding to the current row of coding blocks being encoded or decoded in the current frame, from one or more rows of reference coding blocks preceding the row of reference coding blocks, and from one or more rows of reference coding blocks following the row of reference coding blocks. The number of rows of coding blocks in the vertical range may be a design decision, a parameter, a combination thereof, or the like.

Figure 12A:
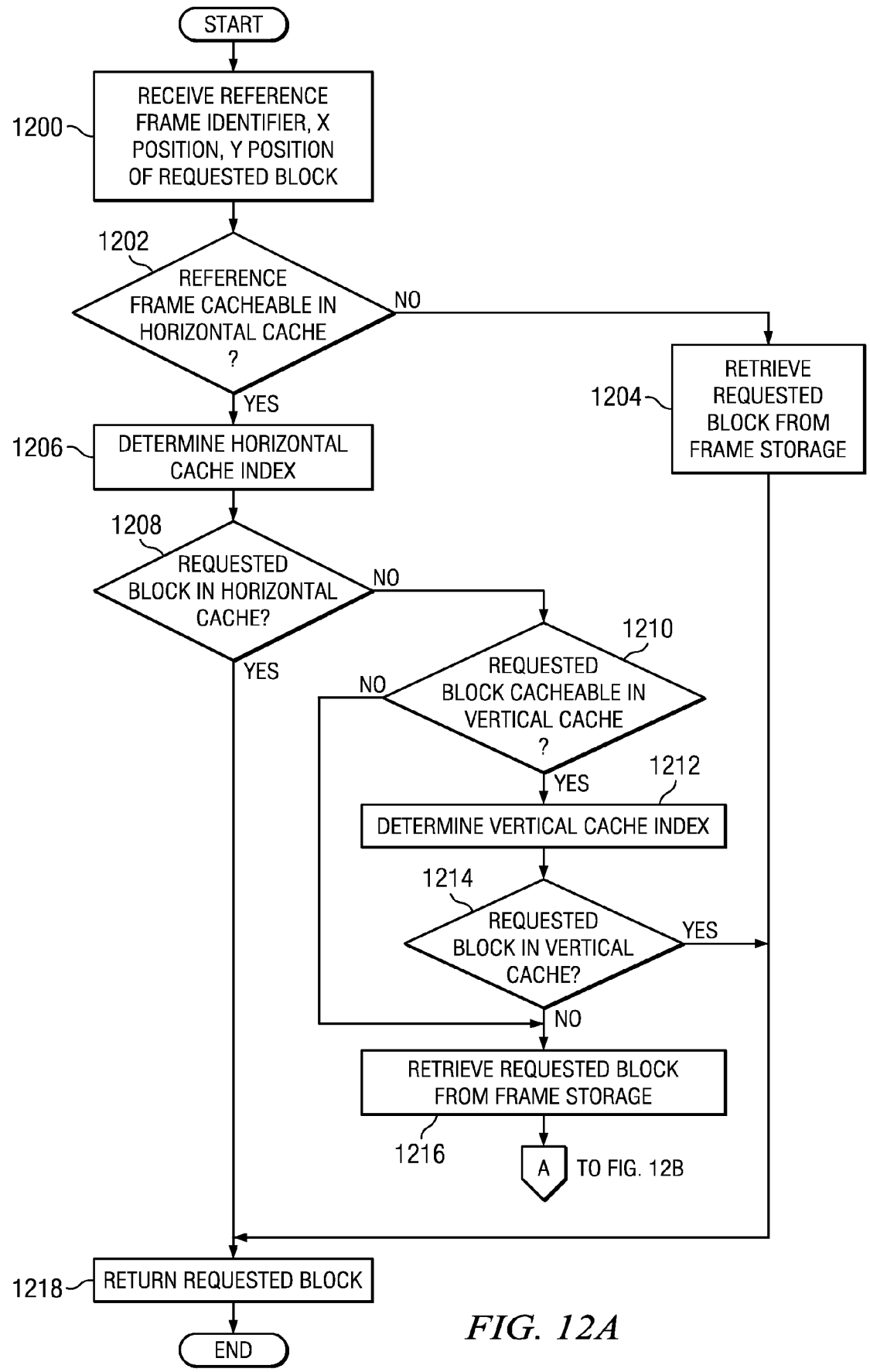
Figure 12B:
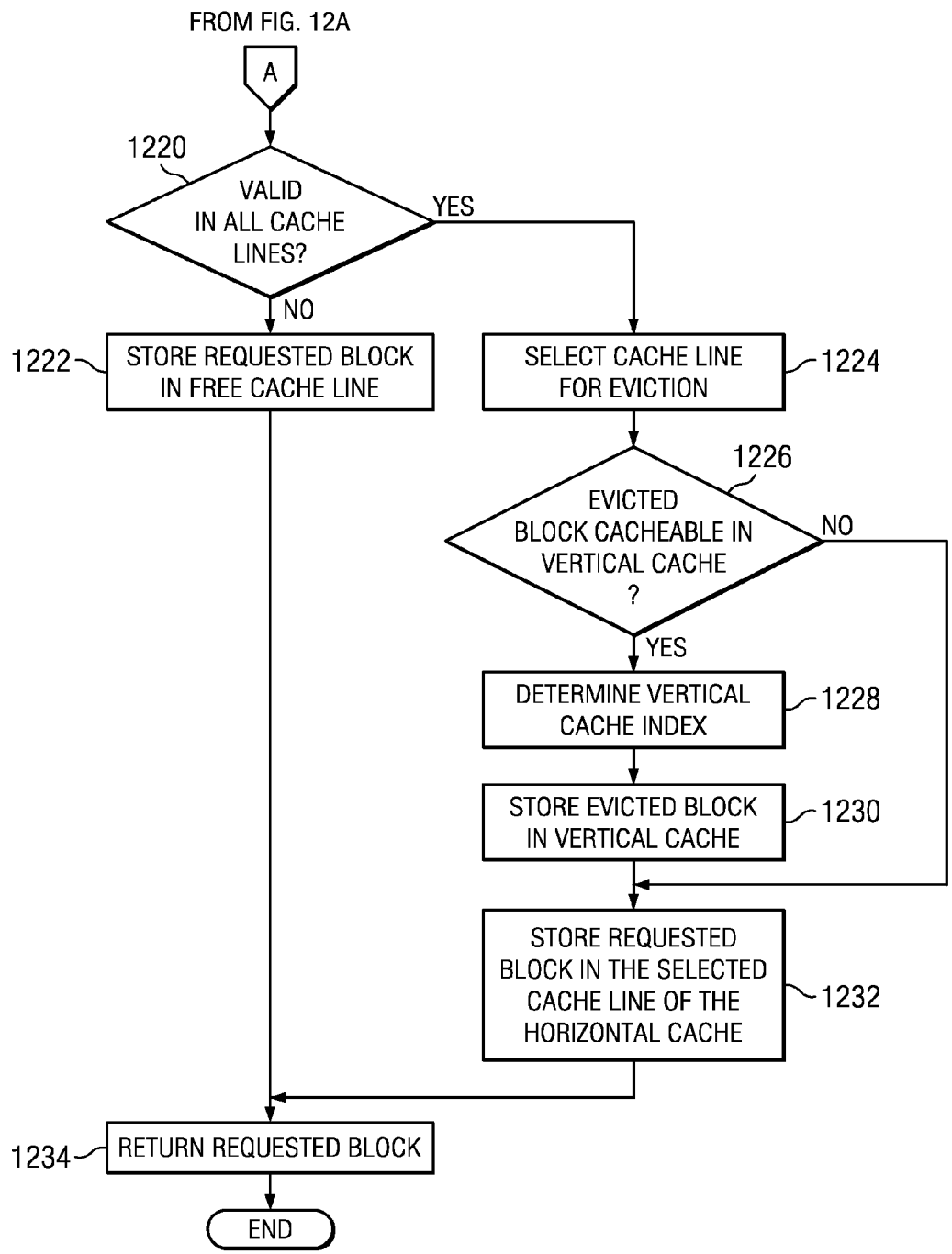

As is explained in more detail in reference to FIGS. 12A and 12B herein, reference data blocks evicted from the horizontal cache are stored in the vertical cache if the evicted reference data blocks are within the current window, i.e., the current vertical range, of the vertical cache. In some embodiments of the invention, in addition to being within the current window of the vertical cache, the evicted reference data blocks must also be from the most temporally recent reference frame. Further, if there is a cache miss for a requested reference data block in the horizontal cache, the vertical cache is checked for the requested reference data block. If there is also a cache miss in the vertical cache, the requested reference data block is then retrieved from the frame storage component (240, 312) and stored in a cache line of the horizontal cache. In some embodiments of the invention, the address of the requested reference data block is converted to an address in the frame storage component (240, 312).

Figure 9A:
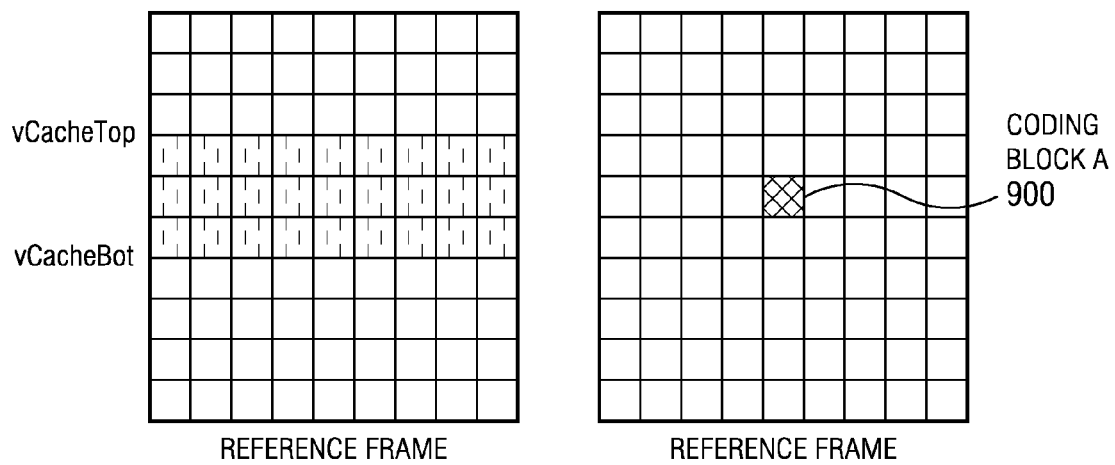
FIG. 9 shows an example in accordance with one or more embodiments of the invention.
Figure 9B:
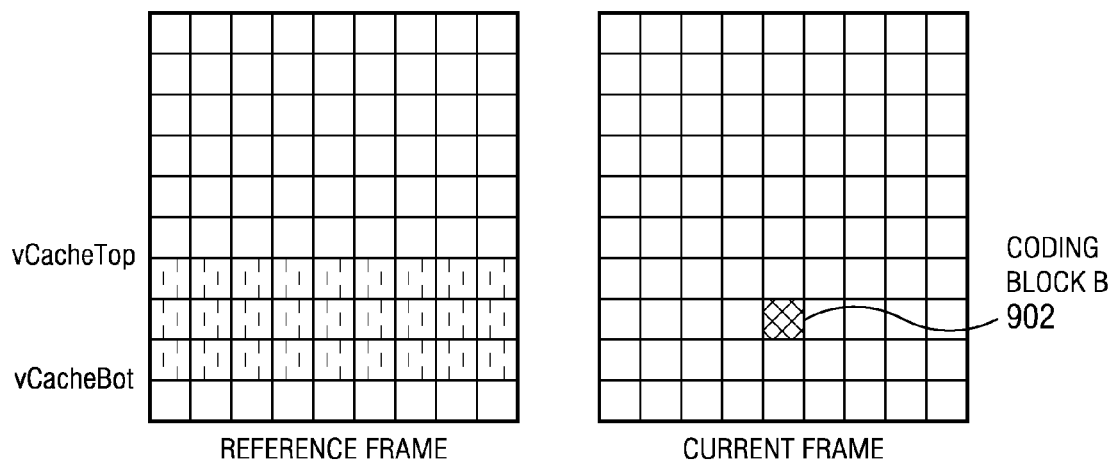

The vertical range bounds a vertically moving window of reference coding blocks that may be stored in the vertical cache. That is, each time encoding or decoding of a row of coding blocks in the current frame is completed, the window of reference coding blocks is moved down by one row. FIGS. 9A and 9B are examples illustrating this vertically moving window. In these examples, the vertical range of the vertical cache is three rows of reference coding blocks, and vCacheTop and vCacheBot are the top and bottom of the current window. When coding block A (900) (or any other coding block within the same row) in the current frame is being encoded or decoded, reference data blocks in window bounded by vCacheTop and vCacheBot may be stored in the vertical cache. However, when coding block B (902) (or any other coding block within the same row) in the current frame is being encoded or decoded, the window in the reference frame is moved down vertically in the reference frame. Further, any cache lines storing reference data blocks from a row of coding blocks no longer in the window are invalidated when the window is moved.

The vertical cache includes data storage and valid bit storage. The data storage and the valid bit storage may be combined or may be separate. The data storage is partitioned into multiple cache lines, each of a sufficient size to store one reference data block. Further, the cache line size of the vertical cache is the same as that of the horizontal cache. The data storage includes sufficient memory to provide a unique cache line for each reference data block within the predetermined vertical range. The valid bit storage includes sufficient memory to store one bit for each cache line in the vertical cache.

The amount of memory in the data storage is a design choice based on the desired verticality of the cache, i.e., how many rows of reference coding blocks are to be accommodated, the frame width of the largest frame to be encoded or decoded, the size of a coding block, and the size of a reference data block. For example, if a reference coding block is 16×16 and a reference data block is 4×4, 16 16-byte cache lines are required to store the reference data blocks of one reference coding block. If the width of the largest frame is 1920, there are 120 reference coding blocks in a row of the frame. Thus, 1920 16-byte cache lines are required to store the reference data blocks in one row of a reference coding block of the frame. If the vertical range of the vertical cache is three rows of reference coding blocks, then 3×1920=5760 16-byte cache lines are required to store the reference data blocks in the vertical range. Accordingly, for this example, the data storage is required to be a minimum of 90 KB.

Any suitable implementation may be used for the vertical cache. In some embodiments of the invention, the vertical cache is implemented a memory buffer such as a circular buffer. FIGS. 10A-10D show block diagrams of example vertical caches implemented as buffers in accordance with one or more embodiments of the invention. That is, in FIGS. 10A and 10B, the data storage is managed as a linear buffer and in FIGS. 10C and 10D, the data storage is managed as a circular buffer. These examples assume that the coding blocks are 16×16 macroblocks and that reference data blocks (tiles) are 4×4. Further, a vertical cache of sufficient size to store at least 12 rows of reference data blocks (3 rows of macroblocks) is assumed.

Figure 10A:
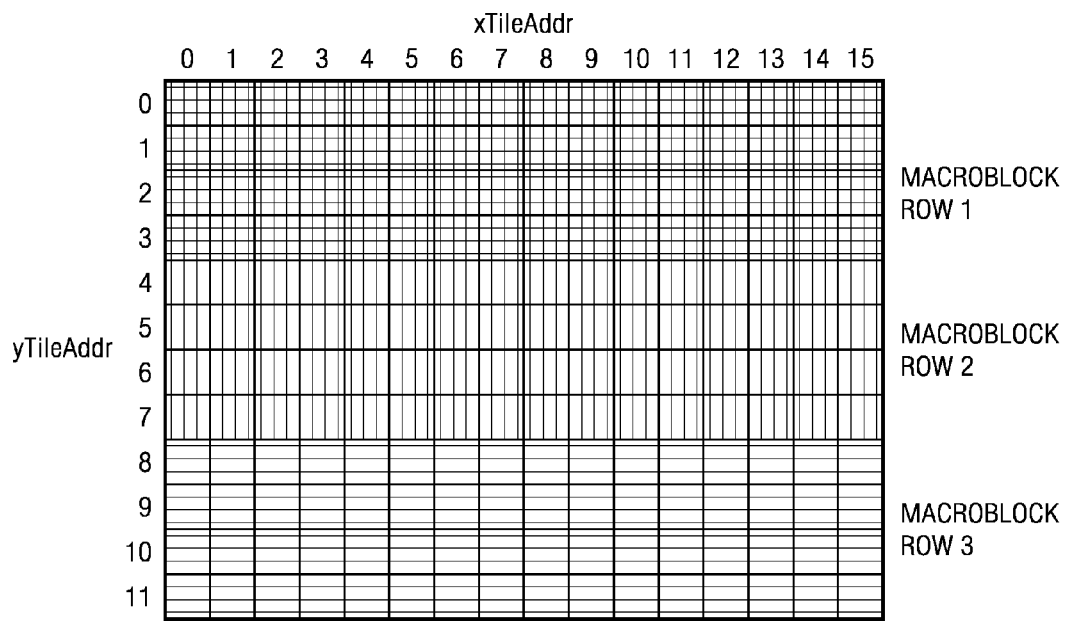
FIGS. 10A-10D show a block diagram of an example vertical reference data cache in accordance with one or more embodiments of the invention.

In FIG. 10A, the data blocks in the current frame corresponding to reference data blocks in macroblock row 2 are being motion compensated and reference data blocks corresponding to the macroblock row undergoing motion compensation are stored in the vertical cache buffer in locations for macroblock row 2, reference data blocks corresponding to the previous macroblock row are stored in the vertical cache buffer in locations for macroblock row 1, and reference data blocks corresponding to the following macroblock row are stored in the vertical cache buffer in locations for macroblock row 3. The reference data blocks are addressed by an index of xTileAddr and yTileAddr where xTileAddr=xAddr/tileSize and yTileAddr=yAddr/tileSize.

Figure 10B:
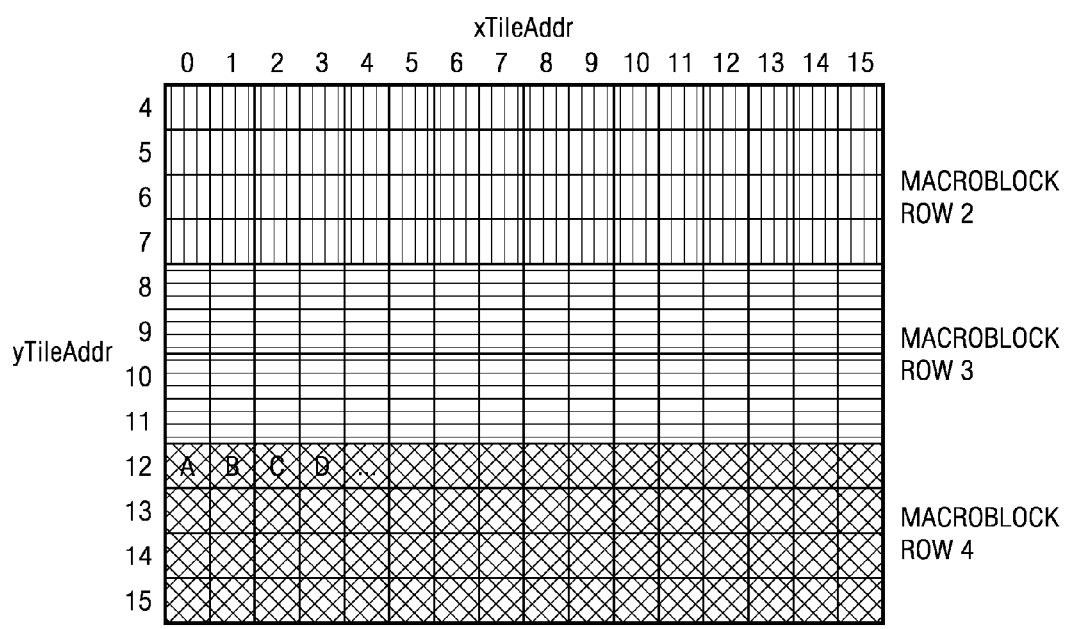

In FIG. 10B, the motion compensation of the row of macroblocks corresponding to macroblock row 2 has been completed, so the vertical cache window is moved one row such that the reference data blocks cached in macroblock row 2 are now considered to be the previous macroblock row, the reference data blocks cached in macroblock row 3 are now the reference data blocks corresponding to the macroblock row undergoing motion compensation, and reference data blocks corresponding to the macroblock row following the macroblock row under motion compensation are stored in locations for macroblock row 4. Note that any reference data blocks stored in the vertical cache when the previous macroblock row was motion compensated, i.e., the reference data blocks in macroblock row 2 and macroblock row 3, will be retained in the vertical cache for use in the motion compensation of the current macroblock row.

Figure 10C:
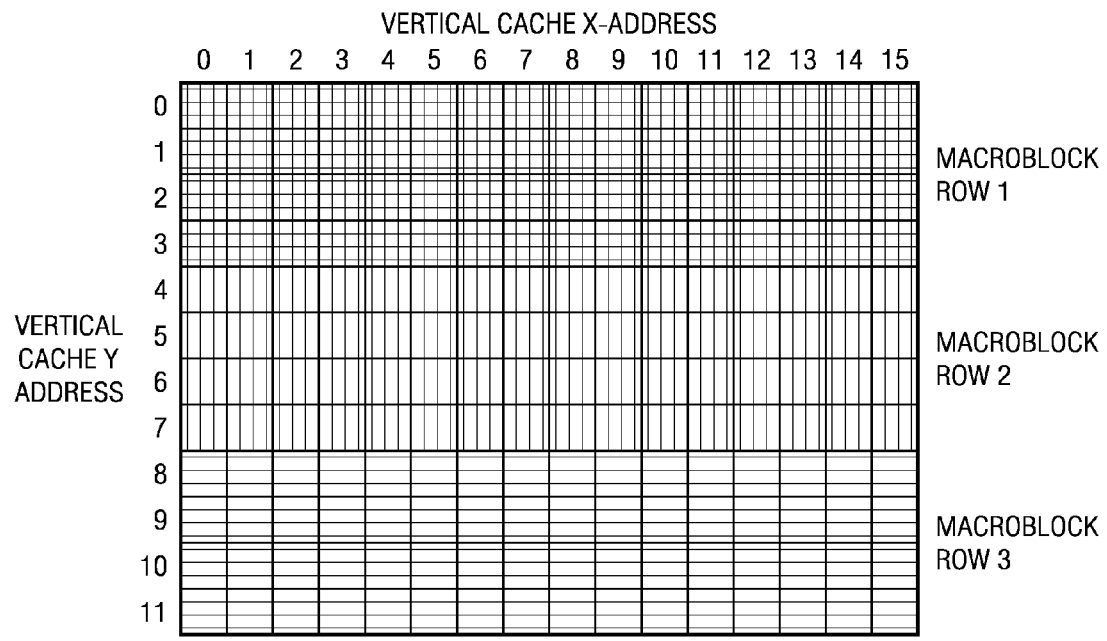

In FIG. 10C, similar to FIG. 10A, the data blocks in the current frame corresponding to reference data blocks in macroblock row 2 are being motion compensated and reference data blocks corresponding to the macroblock row undergoing motion compensation are stored in the vertical cache buffer in locations for macroblock row 2, reference data blocks corresponding to the previous macroblock row are stored in the vertical cache buffer in locations for macroblock row 1, and reference data blocks corresponding to the following macroblock row are stored in the vertical cache buffer in locations for macroblock row 3. The reference data blocks are addressed by an index of verticalCacheXaddress and verticalCacheYaddress where verticalCacheXaddress=xTileAddr=xAddr/tileSize and verticalCacheYaddress=yTileAddr modulo 12 where yTileAddr=yAddr/tileSize.

Figure 10D:
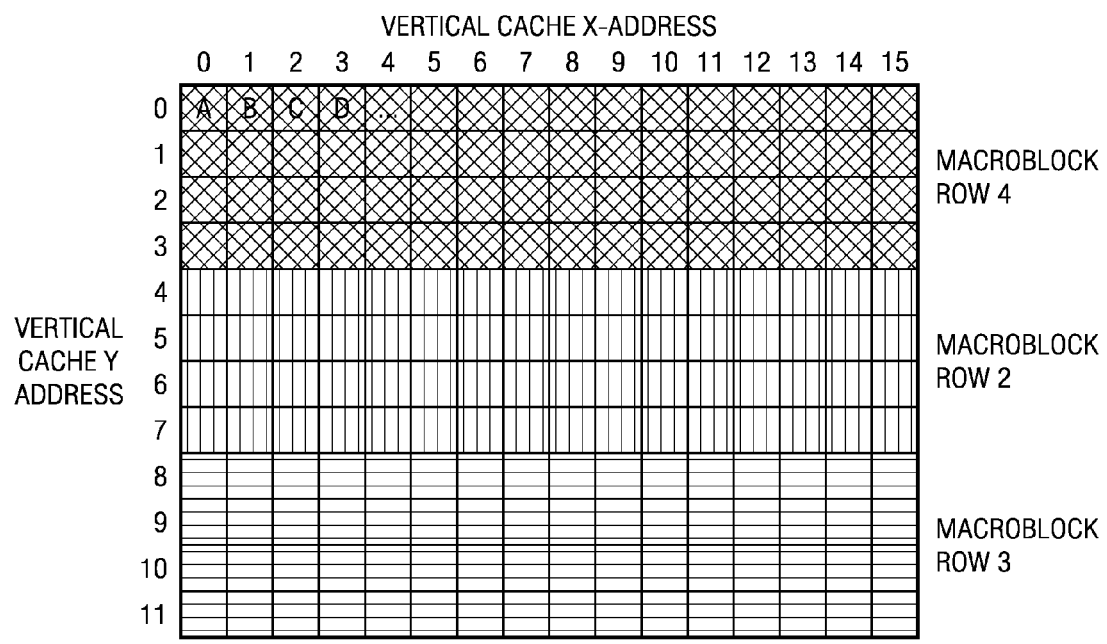

In FIG. 10D, the motion compensation of the row of macroblocks corresponding to macroblock row 2 has been completed, so the vertical cache window is moved one row such that the reference data blocks cached in macroblock row 2 are now considered to be the previous macroblock row, the reference data blocks cached in macroblock row 3 are now the reference data blocks corresponding to the macroblock row undergoing motion compensation, and reference data blocks corresponding to the macroblock row following the macroblock row under motion compensation are stored in locations for macroblock row 4. However, since the data storage is a circular buffer, rather than moving the window down in the buffer, the space formerly allocated for macroblock row 1 is now used to store reference data blocks for macroblock row 4. Note that any reference data blocks stored in the vertical cache when the previous macroblock row was motion compensated, i.e., the reference data blocks in macroblock row 2 and macroblock row 3, will be retained in the vertical cache for use in the motion compensation of the current macroblock row.

In embodiments of the invention providing encoding and decoding of both P-frames and B-frames, the vertical cache is split into two halves with one half used for caching reference data blocks for one prediction direction and one half used for caching reference data blocks in the other prediction direction. In some embodiments of the invention, the prediction direction value for forward prediction is 0 and the prediction direction value for backward prediction is 1.

Figure 11:
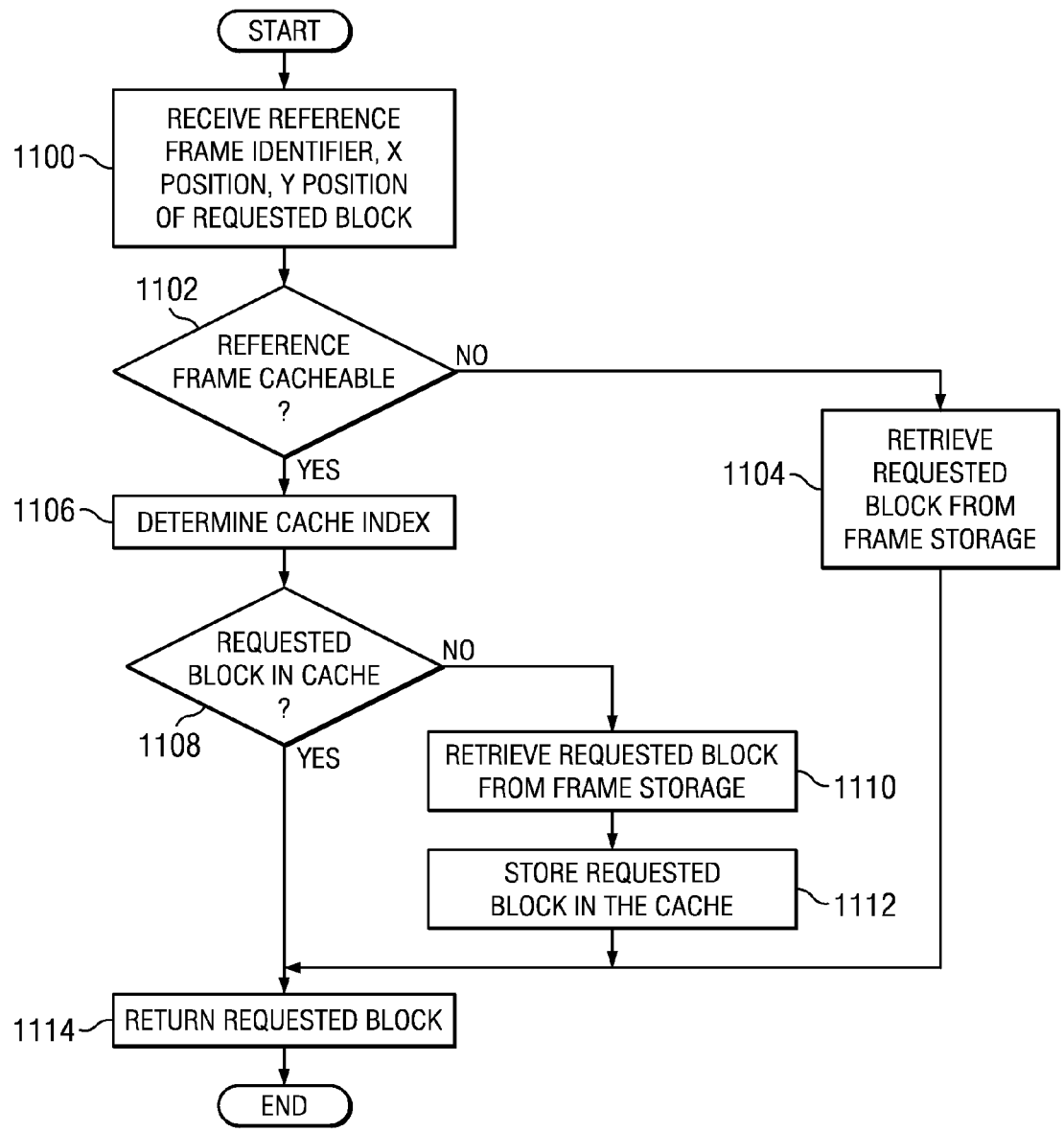
FIGS. 11, 12A, and 12B show flow diagrams of methods in accordance with one or more embodiments of the invention.

FIG. 11 shows a flow graph of a method of caching reference data in accordance with one or more embodiments of the invention. For simplicity of explanation, a two-way associative cache is assumed. One of ordinary skill in the art will understand embodiments of the method with differing cache associativity. Initially, a reference frame identifier, an x coordinate, and a y coordinate of a requested reference data block is received by a reference data cache component from a requesting component (1100). The reference frame identifier, the x coordinate, and the y coordinate form the address of the requested reference data block. That is, the address is a concatenation of the reference frame identifier, the x coordinate, and the y coordinate in some order.

The reference frame identifier is then used to determine if the requested reference data block is in a cacheable reference frame (1102). That is, the reference data cache component may cache reference data blocks from some selected reference frames and not from other reference frames. In some embodiments of the invention, all reference frames are cacheable. In some embodiments of the invention, only the most temporally recent reference frame is cacheable. If the requested reference data block is not in a cacheable reference frame, the requested reference data block is retrieved from the frame storage component (1104) and returned to the requesting component (1114). In some embodiments of the invention, the address of the requested reference data block is converted to an address in the frame storage component.

If the requested reference data block is in a cacheable reference frame, a cache index is determined from the address of the reference data block (1106). In some embodiments of the invention, the index is some number of the least significant bits of the address of the requested reference data block. In some embodiments of the invention, the cache index is computed using a predetermined number of bits from the x coordinate and a predetermined number of bits from the y coordinate as previously described herein. In some embodiments of the invention, the computation of the cache index is adapted based on the prediction direction as previously described herein when the current frame, i.e., the frame being encoded or decoded, is a B-frame.

The index is then used to determine if the requested reference data block is stored in the cache (1108). More specifically, the tags of the two cache lines corresponding to the index location are compared to the tag of the address. If there is a match and the valid bit corresponding to the matching tag indicates the data stored in the cache line is valid, then there is a cache hit, i.e., the requested reference data block is stored in the cache line with the matching tag. The data stored in this cache line is then returned to the requesting component (1114).

If there is no match and/or a corresponding valid bit indicates any data stored in the cache line is invalid, then there is a cache miss, i.e., the requested reference data block is not stored in either of the two cache lines. In this case, the requested reference data block is retrieved from the frame storage component (1110) and stored in one of the two cache lines (1112). In some embodiments of the invention, the address of the requested reference data block is converted to an address in the frame storage component. If both cache lines are invalid, then the retrieved reference data block may be stored in either cache line. If one cache line is valid and the other is invalid, then the retrieved reference data block is stored in the invalid cache line. If both cache lines are valid, then the data in one of the cache lines is evicted to make room for the retrieved reference data block.

The selection of the cache line from which the data is to be evicted may be done using any suitable eviction policy, i.e., replacement policy. In one or more embodiments of the invention, the cache line holding the least recently accessed data is selected. When the retrieved reference data block is stored, the tag for the storing cache line is set to the tag of the requested reference data block, and the valid bit corresponding to the storing cache line is set to indicate the data in the cache line is valid. The requested reference data block is then returned to the requesting component (1114).

FIGS. 12A and 12B show a flow graph of a method of caching reference data using a combination of a horizontal cache and a vertical cache in accordance with one or more embodiments of the invention. For simplicity of explanation, a two-way associative cache is assumed for the horizontal cache. Initially, a reference frame identifier, an x coordinate, and a y coordinate of a requested reference data block is received by a reference data cache component from a requesting component (1200). The reference frame data cache component includes both a horizontal cache and a vertical cache. The reference frame identifier, the x coordinate, and the y coordinate form the address of the requested reference data block. That is, the address is a concatenation of the reference frame identifier, the x coordinate, and the y coordinate in some order.

The reference frame identifier is then used to determine if the requested reference data block is in a cacheable reference frame (1202). That is, the reference data cache component may cache reference data blocks from some selected reference frames and not from other reference frames. In some embodiments of the invention, all reference frames are cacheable. In some embodiments of the invention, only the most temporally recent reference frame is cacheable. If the requested reference data block is not in a cacheable reference frame, the requested reference data block is retrieved from the frame storage component (1204) and returned to the requesting component (1218). In some embodiments of the invention, the address of the requested reference data block is converted to an address in the frame storage component.

If the requested reference data block is in a cacheable reference frame, a cache index for the horizontal cache is determined from the address of the reference data block (1206). In some embodiments of the invention, the index is a sufficient number of the least significant bits of the address of the requested reference data block to form a unique index value for each set of cache lines in the horizontal cache. In some embodiments of the invention, the cache index is computed using a predetermined number of bits from the x coordinate and a predetermined number of bits from the y coordinate as previously described herein. In some embodiments of the invention, the computation of the cache index is adapted based on the prediction direction as previously described herein when the current frame, i.e., the frame being encoded or decoded, is a B-frame.

The index is then used to determine if the requested reference data block is stored in the horizontal cache (1208). More specifically, the tags of the two cache lines corresponding to the index location are compared to the tag of the address. If there is a match and the valid bit corresponding to the matching tag indicates the data stored in the cache line is valid, then there is a cache hit, i.e., the requested reference data block is stored in the cache line with the matching tag. The data stored in this cache line is then returned to the requesting component (1218).

If there is no match and/or a corresponding valid bit indicates any data stored in the cache line is invalid, then there is a cache miss, i.e., the requested reference data block is not stored in either of the two cache lines. When there is a cache miss, the vertical cache may be accessed to determine if the requested reference data block is stored there. First, a determination is made as to whether or not the requested reference data block is cacheable in the vertical cache (1210). A requested reference data block is cacheable if the reference frame containing the requested data block is cacheable and if the requested reference data block is in the current window of the vertical cache in the reference frame. The reference frame identifier in the address of the requested reference data block is used to determine if the requested reference data block is in a reference frame cacheable in the vertical cache. In one or more embodiments of the invention, only the most temporally recent reference frame is cacheable in the vertical cache. The x coordinate and y coordinate of the requested reference data block may be used as previously described herein to determine if the requested reference data block is within the current window of the vertical cache. If the requested reference data block is determined to be cacheable in the vertical cache, then a cache index for the vertical cache is determined as previously described herein (1212).

The index is then used to determine if the requested reference data block is stored in the vertical cache (1214). If the requested reference data block is stored in the cache line of the vertical cache indicated by the index, then there is a cache hit, and the data stored in this cache line is returned to the requesting component (1218). If there is a cache miss or the requested reference data block is not cacheable in the vertical cache, the requested reference data block is retrieved from the frame storage component (1216) and stored in the horizontal cache in one of the two cache lines identified by the horizontal cache index.

If at least one of the cache lines is invalid, i.e., free (1220), then the retrieved reference data block is stored in a free cache line (1222) and the requested reference data block is returned to the requesting component (1234). If both cache lines are valid (1220), then the data in one of the cache lines is selected for eviction (1224) to make room for the retrieved reference data block. The selection of the cache line from which the data is to be evicted may be done using any suitable eviction policy. In one or more embodiments of the invention, the cache line holding the least recently accessed data is selected.

After the cache line is selected, the reference data block currently stored in the cache line, i.e., the evicted reference data block, may be stored in the vertical cache. More specifically, a determination is made as to whether or not the evicted reference data block is cacheable in the vertical cache (1226). An evicted reference data block is cacheable if the reference frame containing the evicted data block is cacheable and if the evicted reference data block is in the current window of the vertical cache in the reference frame. The reference frame identifier in the address of the evicted reference data block is used to determine if the evicted reference data block is in a reference frame cacheable in the vertical cache. In one or more embodiments of the invention, only the most temporally recent reference frame is cacheable in the vertical cache. The x coordinate and y coordinate of the evicted reference data block may be used as previously described herein to determine if the evicted reference data block is within the current window of the vertical cache. If the evicted reference data block is determined to not be cacheable in the vertical cache, then the requested reference data block is stored in the selected cache line of the horizontal cache (1232) and returned to the requesting component (1234).

If the evicted reference data block is determined to be cacheable in the vertical cache, then a cache index for the vertical cache is determined as previously described herein (1228), and the evicted reference data block is stored in the cache line corresponding to the index. The valid bit corresponding to the cache line is also set to indicate that valid data is stored in the cache line. The requested reference data block is then stored in the selected cache line of the horizontal cache (1232) and returned to the requesting component (1234). When the requested reference data block is stored, the tag for the selected cache line is set to the tag of the requested reference data block, and the valid bit corresponding to the selected cache line is set to indicate the data in the cache line is valid.

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 13:
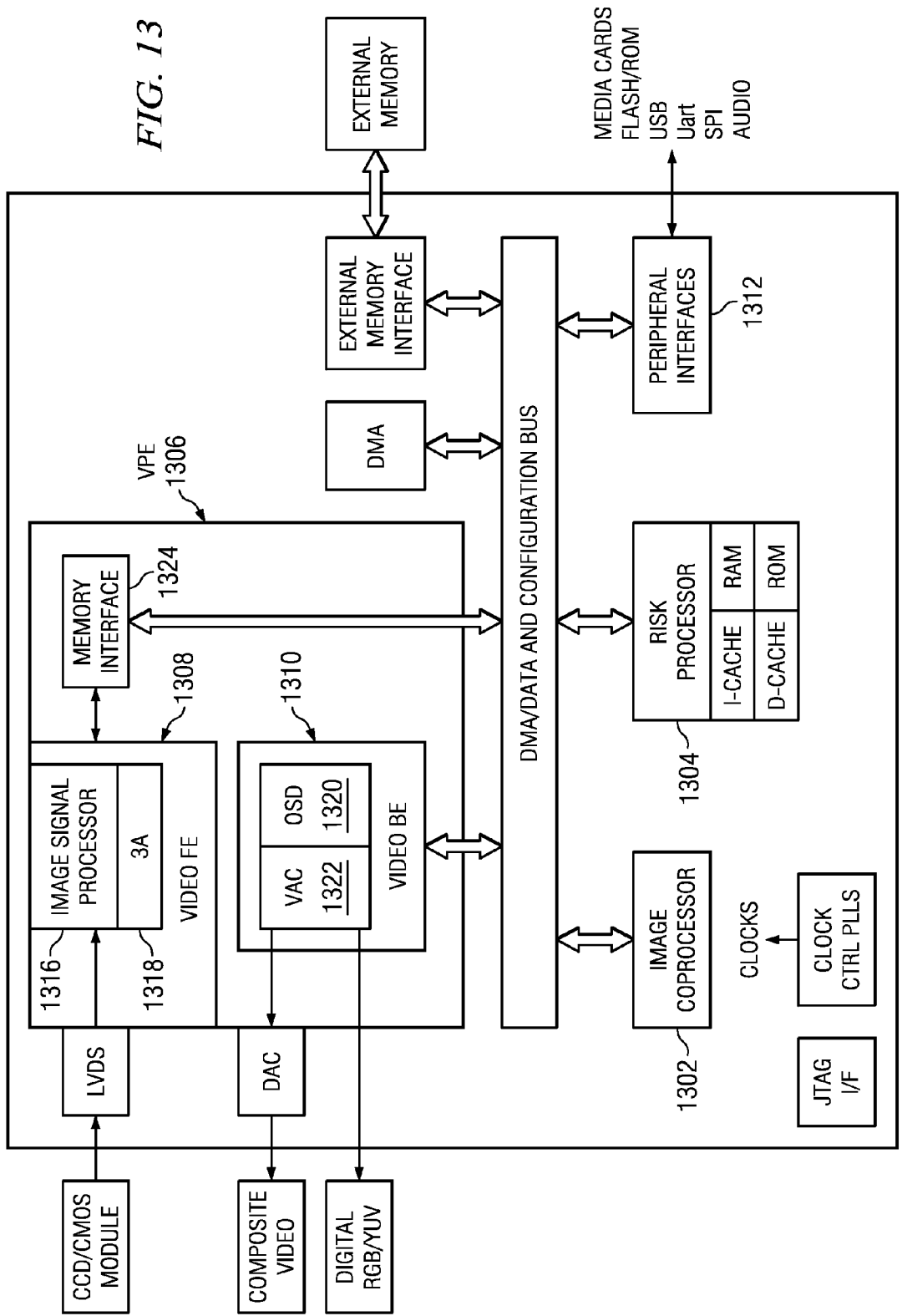
FIGS. 13-15 show illustrative digital systems in accordance with one or more embodiments of the invention.
Figure 14:
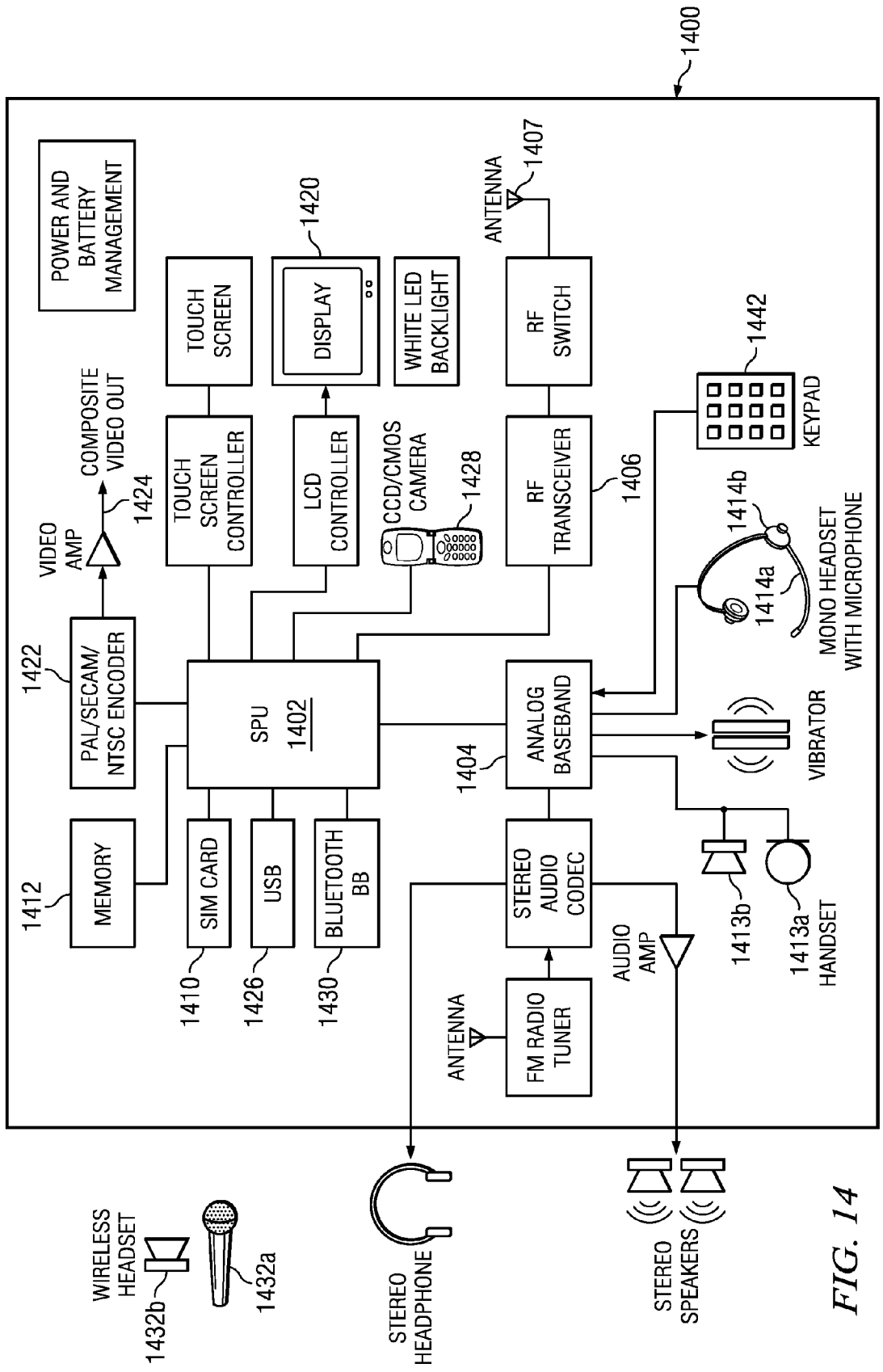
Figure 15:
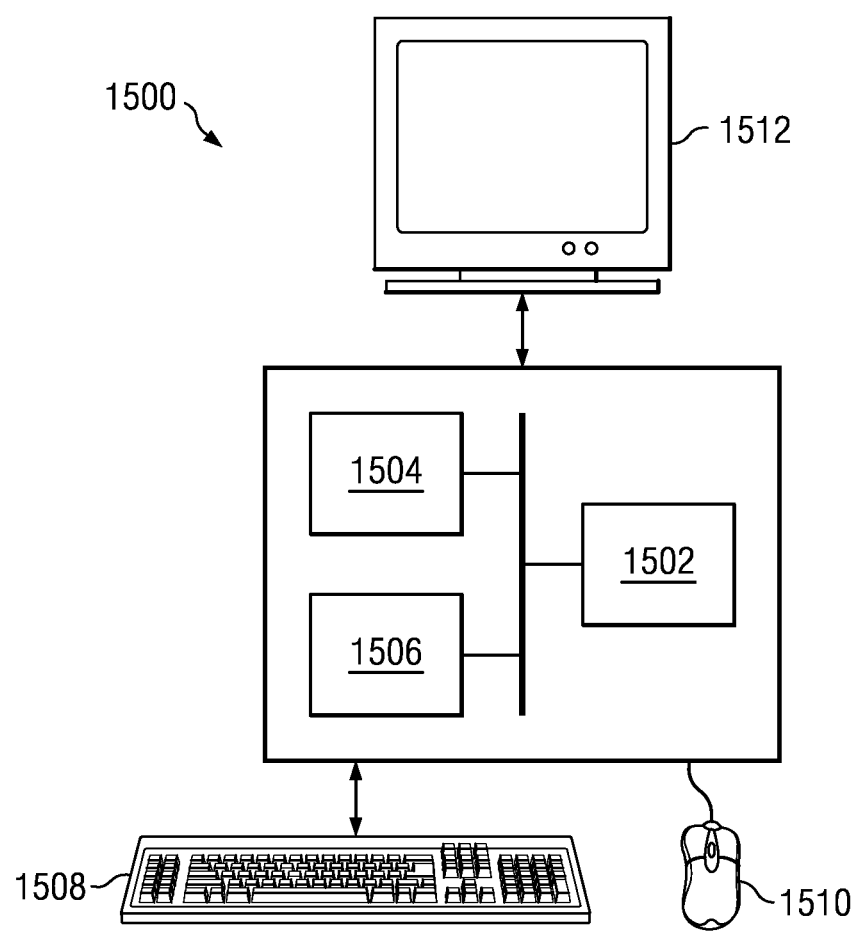

Embodiments of video encoders and video decoders providing reference data caching as described herein may be implemented for virtually any type of digital system (e.g., a desk top computer, a laptop computer, a notebook computer, a handheld device such as a mobile (i.e., cellular) telephone or MP3 player, a personal digital assistant, a digital video camera, a set top box, a digital video recorder (DVR), etc., with functionality to capture (or otherwise generate) digital video sequences and/or to receive and display video sequences. FIGS. 13-15 show block diagrams of illustrative digital systems.

FIG. 13 shows a digital system suitable for an embedded system (e.g., a digital camera) in accordance with one or more embodiments of the invention that includes, among other components, a DSP-based image coprocessor (ICP) (1302), a RISC processor (1304), and a video processing engine (VPE) (1306) that may be configured to perform methods as described herein. The RISC processor (1304) may be any suitably configured RISC processor. The VPE (1306) includes a configurable video processing front-end (Video FE) (1308) input interface used for video capture from imaging peripherals such as image sensors, video decoders, etc., a configurable video processing back-end (Video BE) (1310) output interface used for display devices such as SDTV displays, digital LCD panels, HDTV video encoders, etc, and memory interface (1324) shared by the Video FE (1308) and the Video BE (1310). The digital system also includes peripheral interfaces (1312) for various peripherals that may include a multi-media card, an audio serial port, a Universal Serial Bus (USB) controller, a serial port interface, etc.

The Video FE (1308) includes an image signal processor (ISP) (1316), and a 3A statistic generator (3A) (1318). The ISP (1316) provides an interface to image sensors and digital video sources. More specifically, the ISP (1316) may accept raw image/video data from a sensor (CMOS or CCD) and can accept YUV video data in numerous formats. The ISP (1316) also includes a parameterized image processing module with functionality to generate image data in a color format (e.g., RGB) from raw CCD/CMOS data. The ISP (1316) is customizable for each sensor type and supports video frame rates for preview displays of captured digital images and for video recording modes. The ISP (1316) also includes, among other functionality, an image resizer, statistics collection functionality, and a boundary signal calculator. The 3A module (1318) includes functionality to support control loops for auto focus, auto white balance, and auto exposure by collecting metrics on the raw image data from the ISP (1316) or external memory.

The Video BE (1310) includes an on-screen display engine (OSD) (1320) and a video analog encoder (VAC) (1322). The OSD engine (1320) includes functionality to manage display data in various formats for several different types of hardware display windows and it also handles gathering and blending of video data and display/bitmap data into a single display window before providing the data to the VAC (1322) in YCbCr format. The VAC (1322) includes functionality to take the display frame from the OSD engine (1320) and format it into the desired output format and output signals required to interface to display devices. The VAC (1322) may interface to composite NTSC/PAL video devices, S-Video devices, digital LCD devices, high-definition video encoders, DVI/HDMI devices, etc.

The memory interface (1324) functions as the primary source and sink to modules in the Video FE (1308) and the Video BE (1310) that are requesting and/or transferring data to/from external memory. The memory interface (1324) includes read and write buffers and arbitration logic.

The ICP (1302) includes functionality to perform the computational operations required for video encoding and other processing of captured images. The video encoding standards supported may include one or more of the JPEG standards, the MPEG standards, and the H.26x standards. In one or more embodiments of the invention, the ICP (1302) may be configured to perform the computational operations of methods as described herein.

In operation, to capture an image or video sequence, video signals are received by the video FE (1308) and converted to the input format needed to perform video encoding. The video data generated by the video FE (1308) is stored in then stored in external memory. The video data is then encoded by a video encoder and stored in external memory. During the encoding, the video encoder may use a method for reference data caching as described herein. The encoded video data may then be read from the external memory, decoded, and post-processed by the video BE (1310) to display the image/video sequence.

FIG. 14 is a block diagram of a digital system (e.g., a mobile cellular telephone) (1400) that may be configured to perform reference data caching as described herein. The signal processing unit (SPU) (1402) includes a digital signal processing system (DSP) that includes embedded memory and security features. The analog baseband unit (1404) receives a voice data stream from handset microphone (1413*a*) and sends a voice data stream to the handset mono speaker (1413*b*). The analog baseband unit (1404) also receives a voice data stream from the microphone (1414*a*) and sends a voice data stream to the mono headset (1414*b*). The analog baseband unit (1404) and the SPU (1402) may be separate ICs. In many embodiments, the analog baseband unit (1404) does not embed a programmable processor core, but performs processing based on configuration of audio paths, filters, gains, etc being setup by software running on the SPU (1402).

The display (1420) may also display pictures and encoded video streams received from the network, from a local camera (1428), or from other sources such as the USB (1426) or the memory (1412). The SPU (1402) may also send a video stream to the display (1420) that is received from various sources such as the cellular network via the RF transceiver (1406) or the camera (1428). The SPU (1402) may also send a video stream to an external video display unit via the encoder (1422) over a composite output terminal (1424). The encoder unit (1422) may provide encoding according to PAL/SECAM/NTSC video standards.

The SPU (1402) includes functionality to perform computational operations required for video encoding and decoding. The video encoding standards supported may include, for example, one or more of the JPEG standards, the MPEG standards, the H.26x standards and the emerging HEVC standard. In one or more embodiments of the invention, the SPU (1402) is configured to perform reference data caching as described herein as part of the video encoding and/or decoding. Software instructions implementing computational requirements of the reference data caching may be stored in the memory (1412) and executed by the SPU (1402) as part of capturing and/or encoding and/or decoding of digital image data, e.g., pictures and video streams.

FIG. 15 shows a digital system (1500) (e.g., a personal computer) that includes a processor (1502), associated memory (1504), a storage device (1506), and numerous other elements and functionalities typical of digital systems (not shown). In one or more embodiments of the invention, a digital system may include multiple processors and/or one or more of the processors may be digital signal processors. The digital system (1500) may also include input means, such as a keyboard (1508) and a mouse (1510) (or other cursor control device), and output means, such as a monitor (1512) (or other display device). Those skilled in the art will appreciate that the input and output means may take other forms. The digital system (1500) may also include an image capture device (not shown) that includes circuitry (e.g., optics, a sensor, readout electronics) for capturing video sequences. The digital system (1500) may include a video encoder for encoding the video sequences, the video encoder including functionality to perform reference data caching as described herein.

The digital system (1500) may be connected to a network (not shown) (e.g., a local area network (LAN), a wide area network (WAN) such as the Internet, a cellular network, any other similar type of network and/or any combination thereof) via a network interface connection (not shown). The digital system (1500) may include functionality to receive and display encoded video sequences via the network interface connection, from the storage device (1506), and/or from removable storage media. The digital system (1500) may include a video decoder for decoding the encoded video sequences, the video decoder including functionality to perform reference data caching as described herein.

Further, those skilled in the art will appreciate that one or more elements of the aforementioned digital system (1500) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform computational operations of reference data caching as described herein may be stored on a computer readable medium such as a compact disc (CD), a diskette, a tape, a file, memory, or any other computer readable storage device. The software instructions may be distributed to the digital system (1500) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, in the video encoder, rather than having a shared reference data cache, separate caches may be provided for motion compensation and motion estimation. Accordingly, the scope of the invention should be limited only by the attached claims. It is therefore contemplated that the appended claims will cover any such modifications of the embodiments as fall within the true scope and spirit of the invention.

What is claimed is:

1. A method of caching reference data in a reference data cache, the method comprising: receiving an address of a reference data block in the reference data cache comprising a vertical cache and a horizontal cache, wherein the address comprises an x coordinate and a y coordinate of the reference data block in a reference block of pixels and a reference block identifier specifying which of a plurality of reference blocks of pixels comprises the reference data block, wherein the vertical cache stores reference data blocks within a vertical range of rows of reference coding blocks corresponding to a current row of coding blocks and the horizontal cache stores a reference frame data; computing an index of a set of cache lines in the reference data cache using a predetermined number of bits from the x coordinate and a predetermined number of bits from the y coordinate, wherein the reference data cache is configured to be used for both motion compensation and motion estimation; using the index and a tag comprising the reference block identifier to determine whether the reference data block is in the set of cache lines; and retrieving the reference data block from reference data storage when the reference data block is not in the set of cache lines.

2. The method of claim 1, wherein computing an index further comprises:
adjusting the index based on a prediction direction when a current block of pixels is bi-directionally predicted.

3. The method of claim 1, wherein the reference data cache is configured to store reference data blocks only from a most recently generated reference block of pixels.

4. The method of claim 1, wherein retrieving the reference data block further comprises converting the address to an address in the reference data storage.

5. The method of claim 1, wherein the reference data cache comprises the horizontal cache comprising the set of cache lines and the vertical cache, and wherein retrieving the reference data block comprises retrieving the reference data block from reference data storage when the reference data block is not in the set of cache lines and not in the vertical cache.

6. The method of claim 5, further comprising using the x coordinate and the y coordinate to determine whether the reference data block is in the vertical cache.

7. The method of claim 5, wherein the horizontal cache and the vertical cache are configured to store reference data blocks only from a most recently generated reference block of pixels.

8. A digital system comprising: a reference data storage component configured to store a plurality of reference blocks of pixels; a reference data cache component configured to store reference data blocks from at least one of the plurality of reference blocks of pixels comprising a vertical and a horizontal cache, wherein a reference data block is requested from the reference data cache component using a tiled addressing scheme to identify the reference data block, wherein the reference data cache is configured to be used for both motion compensation and motion estimation, wherein the vertical cache stores reference data blocks within a vertical range of rows of reference coding blocks corresponding to a current row of coding blocks and the horizontal cache stores a reference frame data; and a motion compensation component configured to request a reference data block from the reference data cache component using the tiled addressing scheme, wherein the tiled addressing scheme comprises addressing a reference data block using an x coordinate and a y coordinate of the reference data block in a reference block of pixels, and a reference block identifier specifying which reference block of pixels in the plurality of reference blocks of pixels comprises the reference data block.

9. The digital system of claim 8, wherein the reference data cache component is configured to store reference data blocks only from a most recently generated reference block of pixels of the plurality of reference blocks of pixels.

10. The digital system of claim 8, further comprising a motion prediction component configured to request a reference data block from the reference data component using the tiled addressing scheme.

11. The digital system of claim 8, wherein the reference data cache component is further configured to:
compute an index of a set of cache lines in the reference data cache using a predetermined number of bits from the x coordinate and a predetermined number of bits from the y coordinate, wherein the reference data cache is configured to be used for both motion compensation and motion estimation;
use the index and a tag comprising the reference block identifier to determine whether the reference data block is in the set of cache lines; and retrieve the reference data block from reference data storage when the reference data block is not in the set of cache lines.

12. The digital system of claim 11, wherein the reference data cache component is further configured to adjust the index based on a prediction direction when a current block of pixels is bi-directionally predicted.

13. The digital system of claim 11, wherein the reference data cache component comprises the horizontal cache comprising the set of cache lines and the vertical cache, and wherein the reference data cache component is configured to retrieve the reference data block from reference data storage when the reference data block is not in the set of cache lines and not in the vertical cache.

14. The digital system of claim 13, wherein the reference data cache component is configured to use the x coordinate and the y coordinate to determine whether the reference data block is in the vertical cache.

15. The digital system of claim 13, wherein the horizontal cache and the vertical cache are configured to store reference data blocks only from a most recently generated reference block of pixels.

16. A method of caching reference data in a reference data cache, the method comprising: receiving an address of a reference data block in the reference data cache comprising a vertical and a horizontal cache and, wherein the address comprises an x coordinate and a y coordinate of the reference data block in a reference block of pixels and a reference block identifier specifying which of a plurality of reference blocks of pixels comprises the reference data block, wherein the reference data cache is configured to be used for both motion compensation and motion estimation, wherein the vertical cache stores reference data blocks within a vertical range of rows of reference coding blocks corresponding to a current row of coding blocks and the horizontal cache stores a reference frame data; retrieving the reference data block from reference data storage when the reference block identifier does not identify a most recently generated reference block of pixels; using an index and a tag comprising the reference block identifier to determine whether the reference data block is a set of cache lines in the reference data cache when the reference block identifier identifies a most recently generated reference block of pixels, wherein the index is computed using a predetermined number of bits from the x coordinate and a predetermined number of bits from the y coordinate; and retrieving the reference data block from reference data storage when the reference data block is not in the set of cache lines.

17. The method of claim 16, wherein the index is adjusted based on a prediction direction when a current block of pixels is bi-directionally predicted.

18. The method of claim 16, wherein the reference data cache comprises the horizontal cache comprising the set of cache lines and the vertical cache, and wherein retrieving the reference data block comprises retrieving the reference data block from reference data storage when the reference data block is not in the set of cache lines and not in the vertical cache.

19. The method of claim 18, further comprising using the x coordinate and the y coordinate to determine whether the reference data block is in the vertical cache.

20. The method of claim 18, wherein the vertical cache comprises a circular buffer for storing reference data blocks.

* * * * *